United States Patent
Ansari et al.

(10) Patent No.: US 11,062,674 B2
(45) Date of Patent: Jul. 13, 2021

(54) COMBINED PANEL SELF-REFRESH (PSR) AND ADAPTIVE SYNCHRONIZATION SYSTEMS AND METHODS

(71) Applicant: Intel Corporation, Santa Clara, CA (US)

(72) Inventors: Nausheen Ansari, Folsom, CA (US); Gary Smith, El Dorado Hills, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 16/457,723

(22) Filed: Jun. 28, 2019

(65) Prior Publication Data

US 2019/0325844 A1    Oct. 24, 2019

(51) Int. Cl.
*G09G 5/00* (2006.01)

(52) U.S. Cl.
CPC ....... *G09G 5/008* (2013.01); *G09G 2330/021* (2013.01); *G09G 2350/00* (2013.01); *G09G 2370/04* (2013.01)

(58) Field of Classification Search
CPC ............. G09G 5/008; G09G 2350/00; G09G 2370/04; G09G 2330/021; G09G 2340/14; G09G 2360/127; G09G 2340/0435; G09G 2370/10; G09G 2370/12; G09G 5/006; G06F 1/3265
See application file for complete search history.

(56) References Cited

U.S. PATENT DOCUMENTS

| | | | | |
|---|---|---|---|---|
| 2012/0146968 A1* | 6/2012 | Glen | ............... | G09G 5/003 |
| | | | | 345/204 |
| 2013/0147822 A1* | 6/2013 | Yu | ............... | G09G 5/393 |
| | | | | 345/547 |
| 2014/0055476 A1* | 2/2014 | Wang | ............... | G06T 1/60 |
| | | | | 345/547 |

(Continued)

FOREIGN PATENT DOCUMENTS

| | | |
|---|---|---|
| CN | 112150981 | 12/2020 |
| GB | 2489102 | 9/2012 |

OTHER PUBLICATIONS

European Patent Office, "Extended European Search Report," issued in connection with European Patent Application No. 20164435.8, dated Sep. 29, 2020, 9 pages.

*Primary Examiner* — Maurice L. McDowell, Jr.
(74) *Attorney, Agent, or Firm* — Hanley, Flight & Zimmerman, LLC

(57) ABSTRACT

The present disclosure is directed to systems and methods of maintaining source device to sink device synchronization in systems in which the source device enters a Panel Self-Refresh (PSR/PSR2) mode and the sink device enables adaptive synchronization with the source device. To maintain synchronization, in some instances the source device and the sink device may maintain synchronization contemporaneous with at least a portion of the PSR/PSR2 operating mode. To maintain synchronization, in some instances, a high-bandwidth communications link may be maintained between the source device and the sink device. In some instances, synchronization between the source device and (Continued)

the sink device may be interrupted upon the source device entering the PSR/PSR2 operating mode and may be re-established upon the source device exiting the PSR/PSR2 operating mode.

22 Claims, 9 Drawing Sheets

(56) References Cited

U.S. PATENT DOCUMENTS

| | | | |
|---|---|---|---|
| 2014/0163233 A1 | 6/2014 | Brijesh | |
| 2014/0253537 A1* | 9/2014 | Lee | G09G 5/003 345/214 |
| 2015/0134985 A1* | 5/2015 | Gopal | G06F 1/26 713/320 |
| 2015/0348509 A1* | 12/2015 | Verbeure | G06T 1/20 345/213 |
| 2016/0275919 A1* | 9/2016 | Lawrence | G09G 5/363 |
| 2019/0043458 A1 | 2/2019 | Kwa et al. | |

* cited by examiner

COMBINED PANEL SELF-REFRESH (PSR) AND ADAPTIVE SYNCHRONIZATION SYSTEMS AND METHODS

TECHNICAL FIELD

The present disclosure relates to display technology, more specifically to systems that include Panel Self-Refresh (PSR) and displays that include adaptive synchronization technology.

BACKGROUND

With graphics intensive applications, memory bandwidth represents a significant constraint. Displays featuring Panel Self-Refresh (PSR) capability are equipped with local frame buffers that can be used to provide frame replays. PSR version 2 (PSR2) adds the capability to perform a selective update of specific portions of the display area. Displays equipped with active synchronization technology provide variable vertical blanking duration determined based on the availability of data for the subsequent frame—providing for a variable refresh rate. Current systems provide Adaptive Synchronization to achieve low latency and provide performance benefits in graphics intensive applications where frame rendering may vary. Thus, Adaptive Synchronization systems assist in minimizing tearing and judder effects typically seen on displays having a fixed refresh rate. Panel Self-Refresh technology is typically implemented on systems to reduce power consumption of the device.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
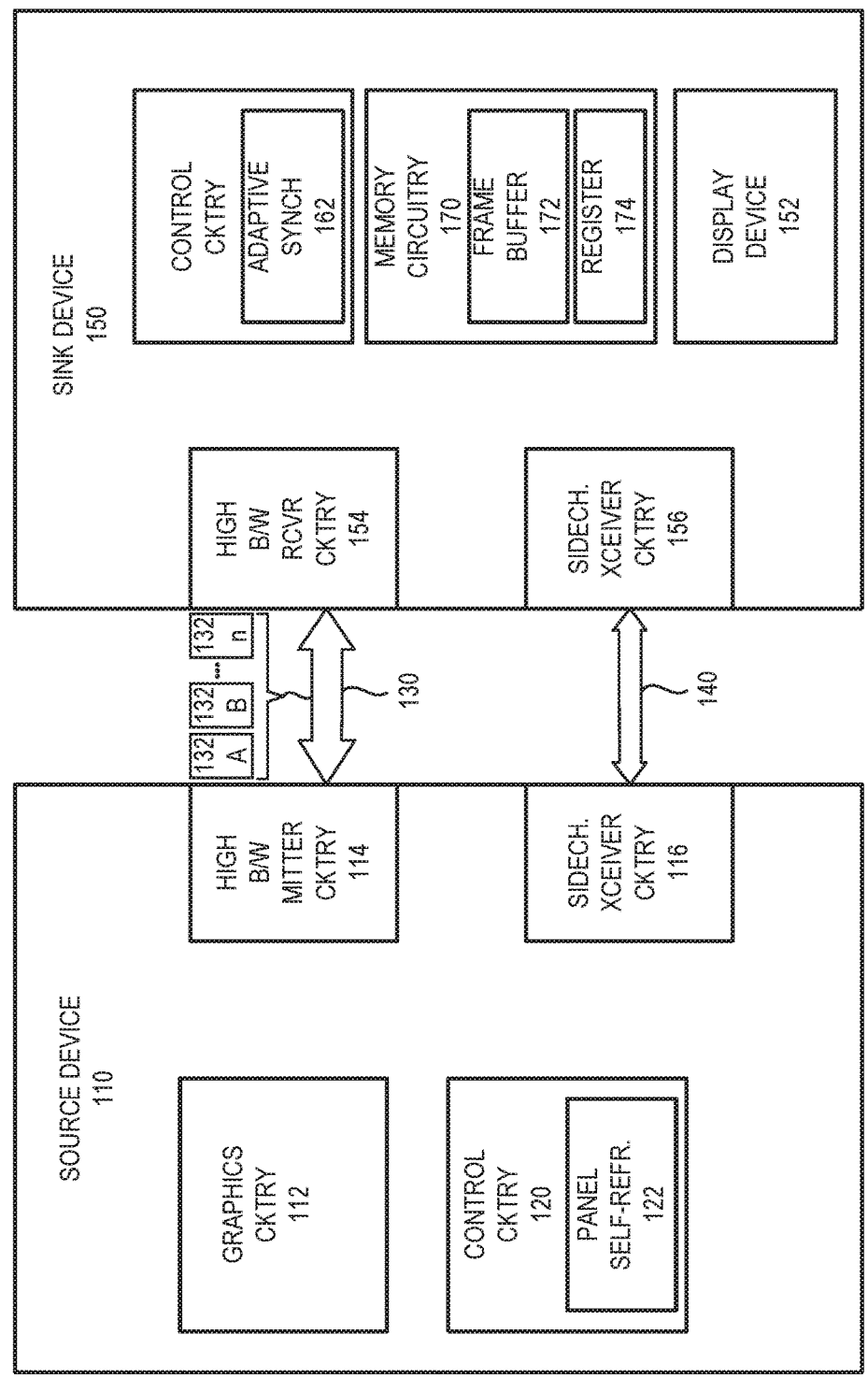
FIG. 1 is a block diagram of an illustrative system that includes a source device with control circuitry having instructions capable of placing the system in a Panel Self-Refresh (PSR) or PSR with Selective Update (PSR2) operating mode and sink device with control circuitry having instructions that implement adaptive synchronization win a communicatively coupled display device, in accordance with at least one embodiment described herein.

Although the following Detailed Description will proceed with reference being made to illustrative embodiments, many alternatives, modifications and variations thereof will be apparent to those skilled in the art.

DETAILED DESCRIPTION

The systems and methods described herein provide systems and methods that take advantage of both: the power saving benefits associated with Panel Self-Refresh (PSR) and the performance benefits of a display device using adaptive synchronization. Panel Self-Refresh (PSR) makes use of a frame buffer disposed in the display device to store image data. When the graphics control circuitry determines that the display image is unchanging, the graphics control circuitry enters a PSR operating mode in which the display device uses the image data stored in the frame buffer. Since the graphics control circuitry no longer generates frame data, the relatively high bandwidth communications link between the graphics control circuitry and the display device may be placed in a standby mode, beneficially reducing power consumption of the device. PSR with selective update (PSR2) adds the capability to selectively update portions of the display image while in the PSR operating mode.

Adaptive synchronization is a technology included in display control circuitry that attempts to match the detected frame generation rate of the graphics control circuitry to the frame refresh rate of the display device. In operation, adaptive synchronization adjusts determines the duration of vertical blanking associated with each frame based on the availability of data associated with the next frame. Entry into the PSR/PSR2 operating mode tends to disrupt the synchronization between the graphics control circuitry and the display device control circuitry. The disruption of synchronization between the graphics control circuitry and the display device control circuitry has heretofore precluded the contemporaneous use of both PSR/PSR2 and adaptive synchronization technologies on a single system.

The systems and methods disclosed herein beneficially provide for the implementation of a PSR/PSR2 operating mode on a system including a display featuring adaptive synchronization technology. The systems and methods disclosed herein either maintain graphics control circuitry/display control circuitry synchronization when in the PSR/PSR2 operating mode or re-establish synchronization upon exiting the PSR/PSR2 operating mode. The systems and methods described herein maintain frame-level synchronization between a source device and an adaptive sync sink device when in PSR/PSR2 operating mode using AUX_FRAME_SYNC to maintain GTC-based synchronization using sideband (AUX) transactions. The systems and methods described herein maintain frame-level synchronization between a source device and an adaptive sync sink device when in PSR/PSR2 operating mode using bidirectional FS_HDP. The systems and methods described herein maintain frame-level synchronization between a source device and an adaptive sync sink device when in PSR/PSR2 operating mode using AUX_FRAME_SYNC to maintain GTC-based synchronization using sideband (AUX) transactions. The systems and methods described herein maintain frame-level synchronization between a source device and an adaptive sync sink device when in PSR/PSR2 operating mode using one or more secondary sideband communication pathways, such as one or more in-silicon communication pathways using a SoC architecture. The systems and methods described herein maintain frame-level synchronization between a source device and an adaptive sync sink device when in PSR/PSR2 operating mode using GTC-based presentation time stamps. The systems and methods described herein maintain frame- or line-level synchronization between a source device and an adaptive sync sink device when in PSR/PSR2 by communicating line and/or frame timing markers (BS/BE) via high-bandwidth connection between the source device and the sink device. The systems and methods described herein maintain frame- or line-level synchronization between a source device and an adaptive sync sink device when in PSR/PSR2 by storing, in the sink device a value indicative of the number of frames required for the sink device to re-synchronize timing upon exiting PSR/PSR2 operating mode.

A data transmission system is provided. The system may include: a source device comprising: high-bandwidth transmitter circuitry; sideband transceiver circuitry; control circuitry to: generate a plurality of frames at one or more frame generation rates; provide the plurality of frames to the high-bandwidth transmitter circuitry; disable at least the high-bandwidth transmitter circuitry responsive to entering a Panel Self-Refresh (PSR) operating mode; synchronize the source device and the sink device responsive to exiting the PSR operating mode; and adjust, by the sink device control circuitry. The system may additionally include: high-bandwidth receiver circuitry to receive the plurality of frames from the source device; sideband transceiver circuitry communicatively coupled to the source device sideband transceiver circuitry; memory circuitry; control circuitry to: cause a storage of at least one frame included in the plurality of frames in the memory circuitry; and adjust a refresh rate of a communicatively coupled display device to the frame generation rate of the source device.

A data transmission method is provided. The method may include: generating, by source device graphics circuitry, a plurality of frames at one or more frame generation rates; providing, by source device control circuitry, each of the plurality of frames to high-bandwidth transmitter circuitry; disabling, by the source device control circuitry, at least the high-bandwidth transmitter circuitry responsive to entering a Panel Self-Refresh (PSR) operating mode; causing, by sink device control circuitry, a storage of at least one frame included in the plurality of frames in sink device memory circuitry; temporally synchronizing the source device and the sink device responsive to exiting the PSR operating mode; and adjusting, by the sink device control circuitry, a refresh rate of a communicatively coupled display device to the frame generation rate of the source device.

A non-transitory storage device is provided. The non-transitory storage device may include instructions that, when executed by circuitry, causes the control circuitry to: cause graphics circuitry to generate a plurality of frames at one or more frame generation rates; provide each of the plurality of frames to high-bandwidth transmitter circuitry; and disable at least the high-bandwidth transmitter circuitry responsive to entering a Panel Self-Refresh (PSR) operating mode; cause a storage of at least one frame included in the plurality of frames in sink device memory circuitry; temporally synchronize the source device and the sink device responsive to exiting the PSR operating mode; and adjust a refresh rate of a communicatively coupled display device to the frame generation rate of the source device.

As used herein the terms "high-bandwidth" and "low-bandwidth" are relative terms to indicate a relatively high-speed communication pathway (e.g., a "high-bandwidth" or a communication pathway having a high data transfer rate relative to the low-bandwidth communication pathway) and a relatively low-speed communication pathway (e.g., a "low-bandwidth" or a communication pathway having a low data transfer rate relative to the high-bandwidth communication pathway).

FIG. 1 is a block diagram of an illustrative system 100 that includes a source device 110 with control circuitry 120 having instructions 122 capable of placing the system 100 in a Panel Self-Refresh (PSR) or PSR with Selective Update (PSR2) operating mode and s sink device 150 with control circuitry 160 having instructions 162 that implement adaptive synchronization win a communicatively coupled display device 152, in accordance with at least one embodiment described herein. A high-bandwidth communications link 130 bidirectionally communicatively couples a high-bandwidth transmitter circuit 114 in the source device 110 with a high-bandwidth receiver circuit 154 in the sink device 150. A low-bandwidth communications link 140 communicably couples a side-channel transceiver circuit 116 in the source device 110 with a side-channel transceiver circuit 156 in the sink device 150.

The source device 110 includes graphics circuitry 112, high-bandwidth transmitter circuitry 114, side-channel transceiver circuitry 116, and the control circuitry 120. The control circuitry 120 may include one or more instructions and/or instruction sets capable of placing the system 100 in a PSR/PSR2 operating mode. When in the PSR/PSR2 operating mode, in some embodiments, when in the PSR/PSR2 operating mode, the control circuitry 120 may place the high-bandwidth transmitter circuit 114, high-bandwidth receiver circuit 154, and the high-bandwidth communications link 130 in a standby or other low power consumption mode.

The sink device 150 includes control circuitry 160, memory circuitry 170, one or more display devices 152, the high-bandwidth receiver circuit 154, and the side-channel transceiver circuitry 156. In embodiments, the sink device control circuitry 160 may execute adaptive synchronization instructions 162 that adjust the vertical blanking (VB) interval between display image frames to match the frame rate of the display device 152 to the frame generation rate of the graphics circuitry 112. The memory circuitry 160 may include frame buffer circuitry 172 and may also include one or more register circuits 174 to store data.

In operation, the graphics circuitry 112 generates a sequence containing a plurality of frames 132A-132n (collectively, "frames 132"). Each of the frames 132 is communicated to the sink device 150 via the high-bandwidth communications link 130. In embodiments, each of the frames 132 may include data representative of a display image for presentation by the display device 152. In embodiments, the graphics circuitry 112 may generate the frames at a fixed rate (e.g., 60 frames per second—"fps") or at a variable rate (e.g., between 30 fps and 120 fps) dependent on the frame content, frame complexity and/or frame computational demand placed on the graphics circuitry 112. Where the display image data in consecutive frames 132 remains unchanged or minimally changed, the graphics circuitry 112 may place the system 100 in a PSR/PSR2 operational mode that: stores image data carried by a current frame 132A in the frame buffer 172 of the sink memory circuitry 170 and replays the display image stored in the frame buffer 172 on the display device 152 until the graphics circuitry 112 exits the PSR/PSR2 operating mode. In the PSR/PSR2 operating mode, the control circuitry 120 causes the high-bandwidth transmitter circuit 114, the high-bandwidth receiver circuit 154, and the high-bandwidth communications link 130 to enter a standby or similar low power consumption mode.

Within the sink device 150, the sink control circuitry 160 causes the display device 152 to sequentially present the image data included in each of the frames 132. A VB interval temporally separates each of the frames 132A-132n. In embodiments, the VB interval is a variable temporal interval continuously, selectively adjustable between a minimum value and a maximum value by the sink control circuitry 160. In embodiments, the sink control circuitry 160 may execute adaptive synchronization instructions 162 that selectively adjust the VB interval such that the frame display rate of the sink device 150 matches the frame generation rate of the source device 110. However, when the source control circuitry 120 places the system 100 in PSR/PSR2 operating mode, the timing data that synchronizes the frame transfers from the source device 110 to the sink device 150 may be lost.

In some embodiments, synchronization between the source device 110 and the sink device 150 may be maintained through the duration of the PSR/PSR2 operating mode. In other embodiments, synchronization between the source device 110 and the sink device 150 may be interrupted and at least one of the source device 110 and/or the sink device 150 may store information and/or data used to resynchronize the source device 110 with the sink device 150 upon exiting the PSR/PSR2 operating mode.

The source device 110 may include any number and/or combination of currently available and/or future developed electronic components, optical components, semiconductor devices, and/or logic elements capable of generating a plurality of frames 132A-132n and communicating the frames 132 to the sink device 150. In embodiments, the source device 110 may include a System-on-Chip (SoC) or similar semiconductor device architecture. In embodiments, some or all of the graphics circuitry 112, source control circuitry 120, high-bandwidth transmitter circuitry 114, and the side-channel transceiver circuitry 116 may included integrated circuit chiplets that together form a SoC. In embodiments, the source device 110 may form at least a portion of a portable computing device, such as a smartphone, wearable computer, portable computer, laptop computer, or similar.

The graphics circuitry 112 may include any number and/or combination of currently available and/or future developed electronic components, optical components, semiconductor devices, and/or logic elements capable of generating image data for communication to the sink device 150 via the plurality of frames 132A-132n. In at least some embodiments, the graphics circuitry 112 may include a graphics processing unity (GPU) or similar. In embodiments, the graphics circuitry 112 may include any number and/or combination of processing units, microprocessors, vector or tensor mathematical units, accelerators, and the like.

The source control circuitry 120 may include number and/or combination of currently available and/or future developed electronic components, optical components, semiconductor devices, and/or logic elements capable of executing a PSR/PSR2 instruction set 122 that causes the system 100 to enter/exit a PSR/PSR2 operating mode. In at least some embodiments, the high-bandwidth communications link 130, the high-bandwidth transmitter circuit 114, and/or the high-bandwidth receiver circuit 154 may be placed in a standby or low power consumption operating mode for at least a portion of the duration of the PSR/PSR2 operating mode. In embodiments, the source control circuitry 120 may maintain temporal synchronization with the sink control circuitry 160 contemporaneous with at least a portion of the duration of the PSR/PSR2 operating mode.

The high-bandwidth transmitter circuit 114 may include any number and/or combination of currently available and/or future developed electronic components, optical components, semiconductor devices, and/or logic elements capable of communicating relatively high-bandwidth signals that include image data generated by the graphics circuitry 112 to the sink device 150 via the high-bandwidth communications link 130. In embodiments, the high-bandwidth transmitter circuit 114 may include a high-bandwidth transceiver. In embodiments, the high-bandwidth transmitter circuit 114 may include DisplayPort compliant transceiver circuitry.

The side-channel transceiver circuitry 116 may include any number and/or combination of currently available and/or future developed electronic components, optical components, semiconductor devices, and/or logic elements capable of communicating relatively low bandwidth signals that include commands, control, and/or timing data generated by the source control circuitry 120 to the sink device 150 via the low-bandwidth communications link 140. In embodiments, the graphics circuitry 112, the control circuitry 120, the high-bandwidth transmitter circuit 114, and the side-channel transceiver circuitry 116 may be communicatively coupled to each other via one or more communications structures, busses, or similar.

The sink device 150 may include one or more display systems that include but are not limited to one or more light emitting diode (LED) display systems, one or more liquid crystal display (LCD) systems, one or more organic LED (OLED) systems; one or more polymer LED (PLED) systems, one or more transparent OLED (TOLED) systems, or similar. In some embodiments, the source device 110 and the sink device 150 may be disposed in a common enclosure or housing—such as a smartphone, portable computer, or wearable computer. In other embodiments, the source device 110 may be tethered to the sink device 150 via one or more serial busses or one or more parallel busses.

The sink control circuitry 160 may include number and/or combination of currently available and/or future developed electronic components, optical components, semiconductor devices, and/or logic elements capable of executing an adaptive synchronization instruction set 162 that adjusts the VB interval of the display device 152 to synchronize the frame rate of the display device 152 to the frame generation rate of the source device 110. In embodiments, the sink control circuitry 160 may implement adaptive synchronization contemporaneous with the source control circuitry 120 placing the system in a PSR/PSR2 operating mode. In one or more embodiments, temporal synchronization between the source device 110 and the sink device 150 may be maintained throughout all or a portion of the PSR/PSR2 operating mode. In one or more embodiments, temporal synchronization between the source device 110 and the sink device 150 may be interrupted during at least a portion of the PSR/PSR2 operating mode and re-established after the system 100 exits the PSR/PSR2 operating mode.

The sink memory circuitry 170 may include number and/or combination of currently available and/or future developed electronic components, optical components, semiconductor devices, and/or logic elements capable of storing frame data in one or more frame buffer circuits 172. In embodiments, the frame data stored in the one or more frame buffer circuits 172 may be presented by the display device 152 when the sink device 150 is placed in PSR/PSR2 operating mode by the source control circuitry 120. In embodiments, the sink memory circuitry 170 may have any storage capacity. For example, the sink memory circuitry 170 may have a capacity of 256 Megabytes (MB) or greater; 500 MB or greater; 1 Gigabyte (GB) or greater; 5 GB or greater; 10 GB or greater; 50 GB or greater; or 100 GB or greater. The sink memory circuitry 170 may include one or more register circuits 174 to store information and/or data.

The high-bandwidth receiver circuit 154 may include any number and/or combination of currently available and/or future developed electronic components, optical components, semiconductor devices, and/or logic elements capable of receiving relatively high-bandwidth signals that include image data generated by the graphics circuitry 112 via the high-bandwidth communications link 130. In embodiments, the high-bandwidth receiver circuit 154 may include a high-bandwidth transceiver. In embodiments, the high-bandwidth receiver circuit 154 may include DisplayPort compliant transceiver circuitry.

The side-channel transceiver circuitry 156 may include any number and/or combination of currently available and/or future developed electronic components, optical components, semiconductor devices, and/or logic elements capable of bi-directionally communicating relatively low bandwidth signals that include commands, control, and/or timing data generated by the sink control circuitry 160 to the source device 110 via the low-bandwidth communications link 140. In embodiments, the control circuitry 160, the memory circuitry 170, the high-bandwidth receiver circuit 154, the side-channel transceiver circuitry 156, and the display device 152 may be communicatively coupled to each other via one or more communications structures, busses, or similar.

Figure 2:
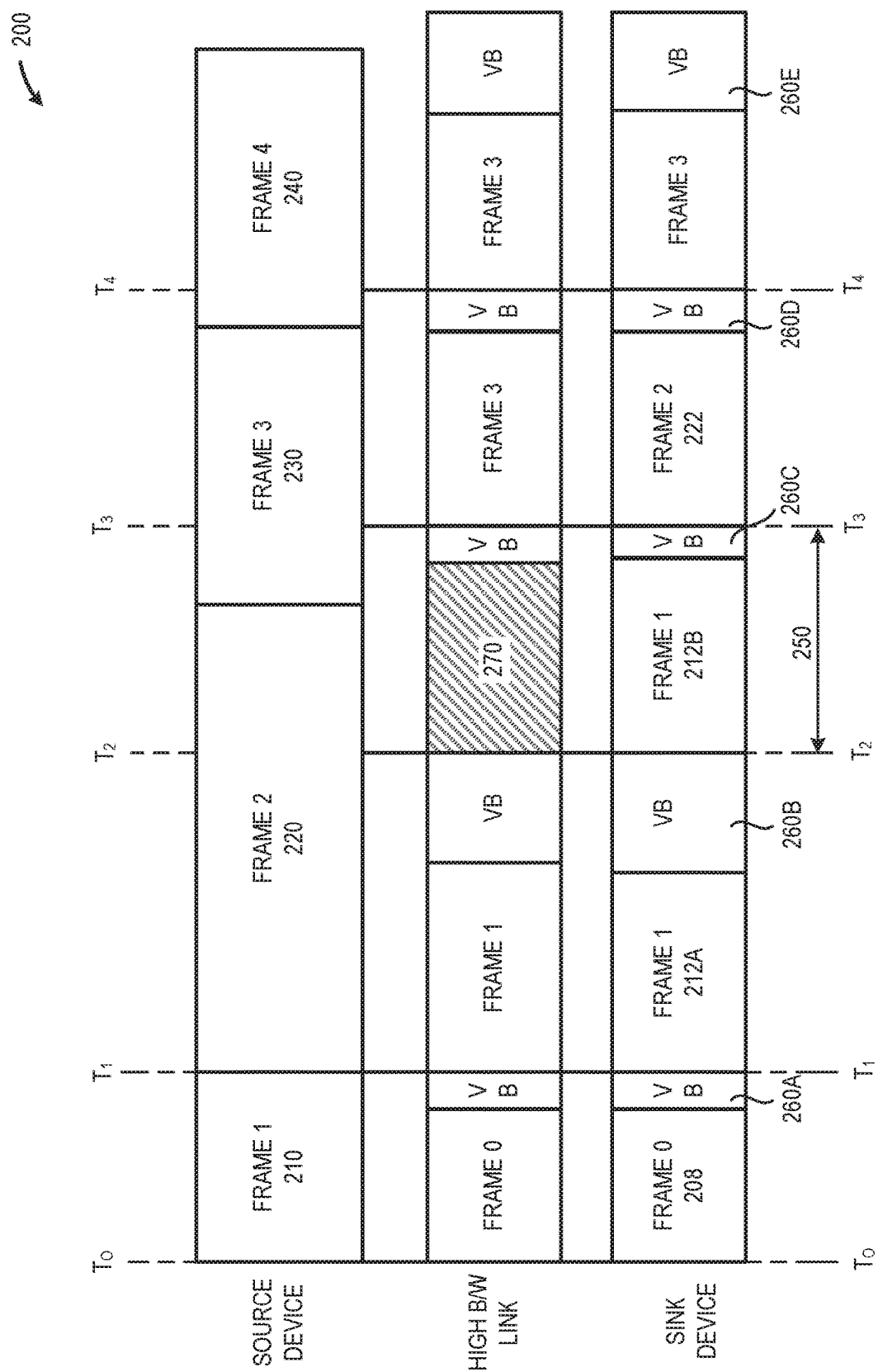
FIG. 2 is a timing diagram depicting an illustrative system in a "Panel Replay Mode" in which the sink device includes adaptive synchronization, in accordance with at least one embodiment described herein.

FIG. 2 is a timing diagram 200 depicting an illustrative system in a "Panel Replay Mode" in which the sink device 150 includes adaptive synchronization, in accordance with at least one embodiment described herein. In embodiments, temporal synchronization between the source device 110 and the sink device 150 may be maintained during all or a portion of the PSR/PSR2 operating mode. In the Panel Replay Mode, the source device 110 controls the display timing and temporal synchronization between the source device 110 and the sink device 150. FIG. 2 also depicts the variable VB interval used by the sink device 150 to synchronize to the source device 110. As depicted in FIG. 2, the source device 150 generates Frame 1 (210), Frame 2 (220), Frame 3 (230), and Frame 4 (240), each of which may be rendered at different frame rates. The sink device 150 attempts to match the frame generation rate of the source 110 by varying the VB interval 260 associated with each image display frame. The source device 110 requires an extended time Frame 2 (220). While the source is generating Frame 2 (220), the sink device 150 displays Frame 1 (212A) and waits the maximum VB interval 260B. When Frame 2 is not available to the sink device 150 after the maximum VB Interval 260B, the sink device 150 again displays Frame 1 (212B). Frame 2 (220) becomes available while the sink device 150 is displaying Frame 1 (212B), thus, after the minimum VB interval 260C, the sink device 150 begins displaying Frame 2 (222). As depicted in FIG. 2, the source control circuitry 120 may place the high bandwidth communications link 130 in a standby or low power consumption mode over interval 270, contemporaneous with the display of Frame 1 (212B) by the sink device 150.

The temporal synchronization between the source device 110 and the sink device 150 may be maintained through all or a portion of the PSR/PSR2 operating mode. For example, the relatively low bandwidth side-channel communicative link 140 may be used for the bidirectional communication of timing information and/or data between the source device 110 and the sink device 150. In the Panel Replay Mode, the sink device updates without delay upon receipt of a full or partial frame. When the source device 110 does not communicate a frame (e.g., when the source control circuitry 120 enters the PSR/PSR2 operating mode), the sink control circuitry 160 causes a presentation of the image data stored in the frame buffer circuitry 172 at the frame time determined by the source device 110. In embodiments, the sink control circuitry 160 may replay the image data stored in the frame buffer circuitry 172 after the maximum BB interval 260. As depicted in FIG. 2, the system 200 maintains a variable temporal synchronization (by adjusting the duration of the VB intervals 260A-260E) at times $T_0$ through $T_4$.

The system 200 may maintain temporal synchronization by maintaining one or more communication links between the source device 110 and the sink device 150 contemporaneous with all or a portion of the PSR/PSR2 operating mode. Such communication may occur via the high-bandwidth communications link 130, the side-channel communications link 140, another direct communication link (i.e., a link between the source device 110 and the sink device 150 that does not include intervening structures), indirect communication link (i.e., a link between the source device 110 and the sink device 150 that includes one or more intervening structures) communication link, or combinations thereof. The following example communications links are provided as illustrative examples, those of skill in the art will readily appreciate that there may be other, system specific, communications links that may directly or indirectly communicatively couple the source device 110 to the sink device 150.

In at least some embodiments, the source control circuitry 120 may be communicatively coupled to the sink control circuitry 160 via the low-bandwidth side-channel communications link 140 and may maintain frame-level temporal synchronization using AUX_FRAME_SYNC. In such embodiments, the high-bandwidth communications link 130 may be placed in a standby or low power mode and communication may be maintained via the low-bandwidth side-channel communications link 140. In such embodiments, the source control circuitry 120 may cause the high bandwidth communications link to remain active and may instead cause the generation and transmission of one or more idle patterns from the source device 110 to the sink device 150 via the high-bandwidth communications link 130.

In at least some embodiments, the source control circuitry 120 may be communicatively coupled to the sink control circuitry 160 via an external communications link and may maintain frame-level temporal synchronization using bidirectional FS_HDP. In such embodiments, HDP may be reused as a bidirectional signal. In such embodiments, the high-bandwidth communications link 130 may be placed in a standby or low power mode and communication may be maintained via the external communications link. In such embodiments, the source control circuitry 120 may cause the high bandwidth communications link to remain active and may instead cause the generation and transmission of one or more idle patterns from the source device 110 to the sink device 150 via the high-bandwidth communications link 130.

In at least some embodiments, the source control circuitry 120 may communicate frame updates that include Presentation Time Stamps based on a Global Time code via the high-bandwidth communications link 140 to maintain frame-level temporal synchronization. In such embodiments, in the absence of frame update transmissions, the source control circuitry 120 may place the high-bandwidth communications link 130 in a standby or low power mode. In such embodiments, in the absence of frame update transmissions, the source control circuitry 120 may cause the high bandwidth communications link to remain active and may instead cause the generation and transmission of one or more idle patterns from the source device 110 to the sink device 150.

In at least some embodiments, the source control circuitry 120 may maintain the high-bandwidth communications link 130 and may communicate line and/or frame timing markers (BS/BE) to maintain line-level and/or frame-level temporal synchronization.

Figure 3:
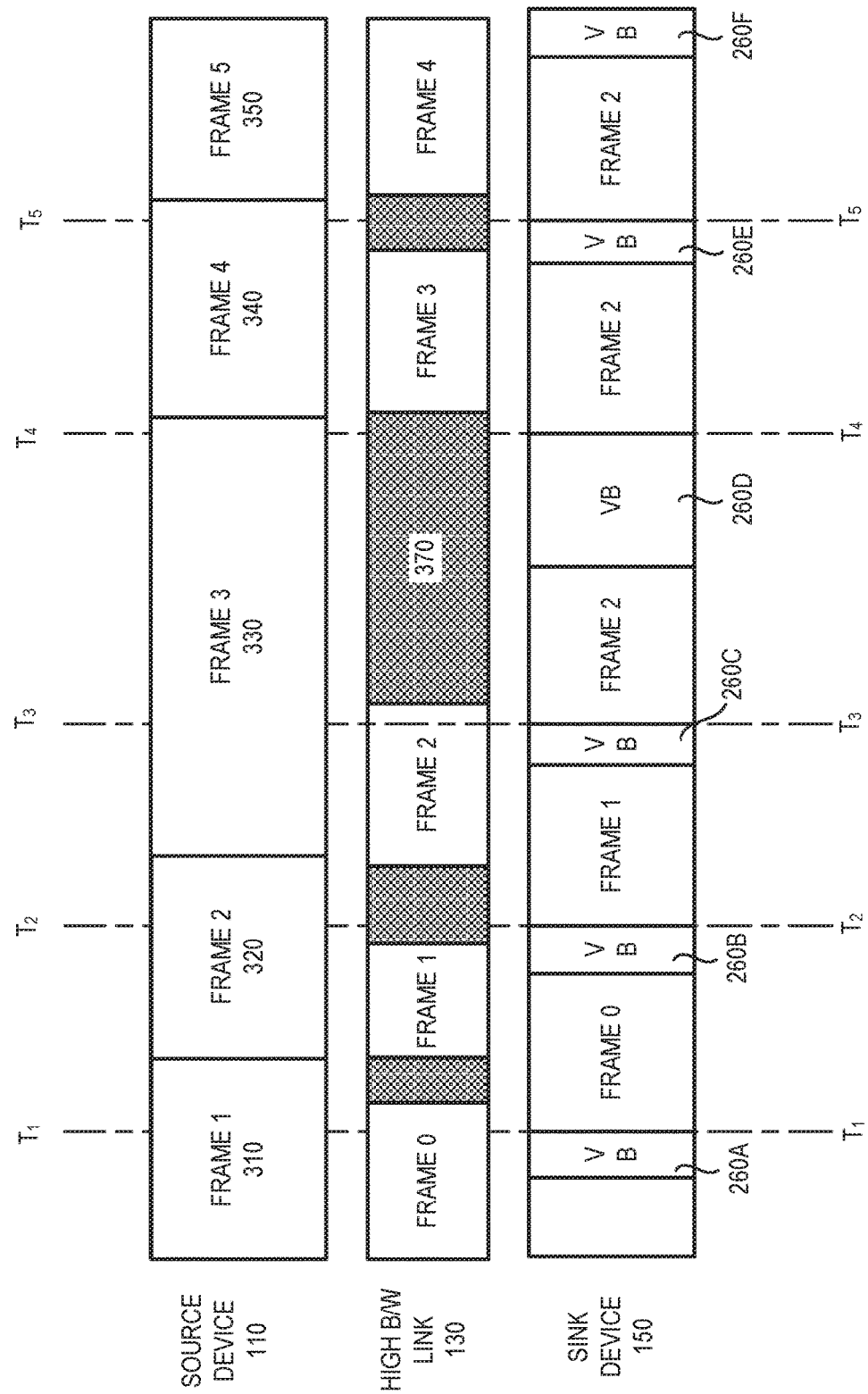
FIG. 3 is a timing diagram depicting an illustrative system in Panel Self-Refresh Mode in which the sink device includes adaptive synchronization, in accordance with at least one embodiment described herein.

FIG. 3 is a timing diagram 300 depicting an illustrative system in Panel Self-Refresh Mode in which the sink device 150 includes adaptive synchronization, in accordance with at least one embodiment described herein. In embodiments, temporal synchronization between the source device 110 and the sink device 150 is not maintained during all or a portion of the PSR/PSR2 operating mode. In the PSR operating mode, the sink device 150 will present image data stored locally in the frame buffer circuitry 172. In the PSR operating mode as depicted in FIG. 3, the source device 110 and the sink device 150 will temporally resynchronize upon exiting the PSR/PSR2 operating mode.

As depicted in FIG. 3, the source device 110 generates Frame 1 (310), Frame 2 (320), Frame 3 (330), Frame 4 (340), and Frame 5 (350) each of which may be rendered at different frame rates. As depicted in FIG. 3, upon completing the rendering of a frame, the source device 110 communicates the respective frame to the sink device 150 via the high-bandwidth link 130. As depicted in FIG. 3, the sink device 150 initially presents the image data from Frame "0." Contemporaneous with the display of Frame "0," the sink device 150 completes the receipt of image data associated with Frame 1 (310) via the high-bandwidth communications link 130. After the minimum VB interval 260B, the sink device displays the image data associated with Frame 1 (310). Contemporaneous with the display of Frame 1 (310), the sink device 150 completes the receipt of image data associated with Frame 2 (320) via the high-bandwidth communications link 130 and, after a minimum VB interval 260C begins displaying the image data associated with Frame 2 (320). Frame 3 (330) data requires an extended time to generate, consequently after waiting the maximum VB interval 260D, the sink device again displays image data associated with Frame 2 (320). Contemporaneous with the display of Frame 2 (320) data, the source control circuitry 120 may place the high-bandwidth communications link 130 in a standby or low power consumption mode.

Figure 4:
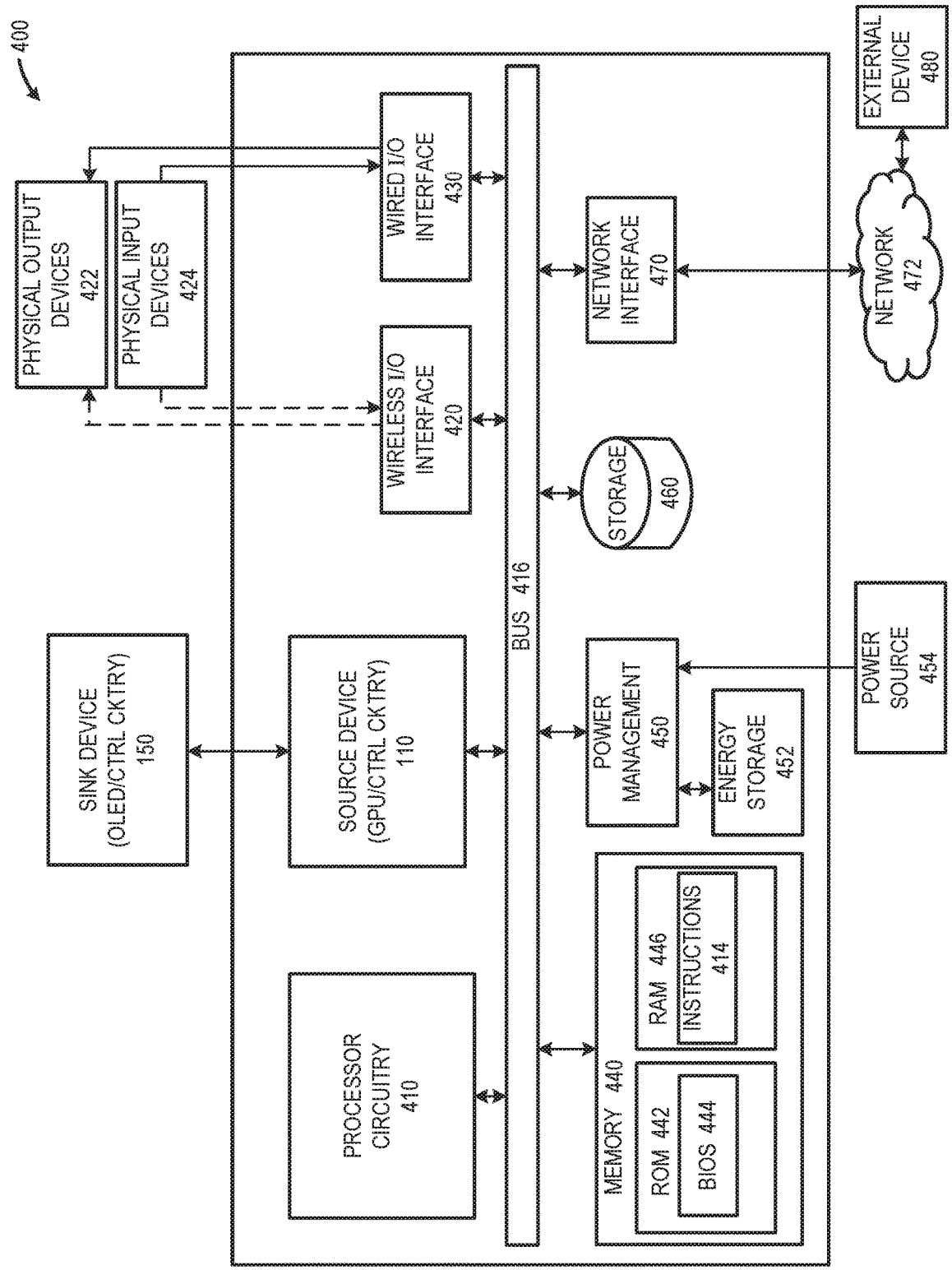
FIG. 4 is a schematic diagram of an illustrative electronic, processor-based, device that includes a graphics processing unit ("GPU")/source device and an OLED display/sink device, in accordance with at least one embodiment described herein.

FIG. 4 is a schematic diagram of an illustrative electronic, processor-based, device 400 that includes a graphics processing unit ("GPU")/source device 110 and an OLED display/sink device 150, in accordance with at least one embodiment described herein. The processor-based device 400 may additionally include one or more of the following: processor circuitry 410, a wireless input/output (I/O) interface 420, a wired I/O interface 430, system memory 440, power management circuitry 450, a non-transitory storage device 460, and a network interface 470. The following discussion provides a brief, general description of the components forming the illustrative processor-based device 400. Example, non-limiting processor-based devices 400 may include, but are not limited to: smartphones, wearable computers, portable computing devices, handheld computing devices, desktop computing devices, blade server devices, workstations, and similar.

In some embodiments, the processor-based device 400 includes processor circuitry 410 capable of executing machine-readable instruction sets and generating an output signal capable of providing a display output to a system user via the OLED display 150. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like. The processor circuitry 410 may include any number of hardwired or configurable circuits, some or all of which may include programmable and/or configurable combinations of electronic components, semiconductor devices, and/or logic elements that are disposed partially or wholly in a PC, server, or other computing system capable of executing machine-readable instructions.

The processor-based device 400 includes a bus or similar communications link 416 that communicably couples and facilitates the exchange of information and/or data between various system components including the processor circuitry 410, the source device/GPU circuitry 110, one or more wireless I/O interfaces 420, one or more wired I/O interfaces 430, the system memory 440, the power management circuitry 450, one or more storage devices 460, and/or one or more network interfaces 470. The processor-based device 400 may be referred to in the singular herein, but this is not intended to limit the embodiments to a single processor-based device 400, since in certain embodiments, there may be more than one processor-based device 400 that incorporates, includes, or contains any number of communicably coupled, collocated, or remote networked circuits or devices.

The processor circuitry 410 may include any number, type, or combination of currently available or future developed devices capable of executing machine-readable instruction sets. The processor circuitry 410 may include but is not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 4 are of conventional design. Consequently, such blocks need not be described in further detail herein, as they will be understood by those skilled in the relevant art. The bus 416 that interconnects at least some of the components of the processor-based device 400 may employ any currently available or future developed serial or parallel bus structures or architectures.

The system memory 440 may include read-only memory ("ROM") 442 and random access memory ("RAM") 446. A portion of the ROM 442 may be used to store or otherwise retain a basic input/output system ("BIOS") 444. The BIOS 444 provides basic functionality to the processor-based device 400, for example by causing the processor circuitry 410 to load and/or execute one or more machine-readable instruction sets, such as the operating system instructions, and/or one or more applications. In embodiments, at least some of the one or more machine-readable instruction sets cause at least a portion of the processor circuitry 410 to provide, create, produce, transition, and/or function as a dedicated, specific, and particular machine, for example a word processing machine, a digital image acquisition machine, a media playing machine, a gaming system, a communications device, a smartphone, or similar.

The processor-based device 400 may include at least one wireless input/output (I/O) interface 420. The at least one wireless I/O interface 420 may be communicably coupled to one or more physical output devices 422 (tactile devices, video displays, audio output devices, hardcopy output devices, etc.). The at least one wireless I/O interface 420 may communicably couple to one or more physical input devices 424 (pointing devices, touchscreens, keyboards, tactile devices, etc.). The at least one wireless I/O interface 420 may include any currently available or future developed wireless I/O interface. Example wireless I/O interfaces include, but are not limited to: BLUETOOTH®, near field communication (NFC), and similar.

The processor-based device 400 may include one or more wired input/output (I/O) interfaces 430. The at least one wired I/O interface 430 may be communicably coupled to one or more physical output devices 422 (tactile devices, video displays, audio output devices, hardcopy output devices, etc.). The at least one wired I/O interface 430 may be communicably coupled to one or more physical input devices 424 (pointing devices, touchscreens, keyboards, tactile devices, etc.). The wired I/O interface 430 may include any currently available or future developed I/O interface. Example wired I/O interfaces include but are not limited to: universal serial bus (USB), IEEE 1394 ("FireWire"), and similar.

The processor-based device 400 may include one or more communicably coupled, non-transitory, data storage devices 460. The data storage devices 460 may include one or more hard disk drives (HDDs) and/or one or more solid-state storage devices (SSDs). The one or more data storage devices 460 may include any current or future developed storage appliances, network storage devices, and/or systems. Non-limiting examples of such data storage devices 460 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 460 may include one or more removable storage devices, such as one or more flash drives, flash memories, flash storage units, or similar appliances or devices capable of communicable coupling to and decoupling from the processor-based device 400.

The one or more data storage devices 460 may include interfaces or controllers (not shown) communicatively coupling the respective storage device or system to the bus 416. The one or more data storage devices 460 may store, retain, or otherwise contain machine-readable instruction sets, data structures, program modules, data stores, databases, logical structures, and/or other data useful to the processor circuitry 410 and/or source device/GPU circuitry 110 and/or one or more applications executed on or by the processor circuitry 410 and/or source device/GPU circuitry 110. In some instances, one or more data storage devices 460 may be communicably coupled to the processor circuitry 410, for example via the bus 416 or via one or more wired communications interfaces 430 (e.g., Universal Serial Bus or USB); one or more wireless communications interfaces 420 (e.g., Bluetooth®, Near Field Communication or NFC); and/or one or more network interfaces 470 (IEEE 802.3 or Ethernet, IEEE 802.11, or WiFi®, etc.).

The one or more data storage devices 460 stores all or a portion of the instructions executed, at least in part, by the processor circuitry 410. The one or more data storage devices 104 may store, include, or otherwise retain operating system instructions. The operating system instructions may include but are not limited to any version up to the latest release of: Windows®; OSx®, iOS®; Android®; Linux®; and similar. The one or more storage devices 460 may store, include, or otherwise retain application instructions executed by the processor circuitry 410. Such applications may include but are not limited to: productivity software; communications software; entertainment software: audio and/or video playback software; or similar.

The processor-based device 400 may include power management circuitry 450 that controls one or more operational aspects of the energy storage device 452. In embodiments, the energy storage device 452 may include one or more primary (i.e., non-rechargeable) or secondary (i.e., rechargeable) batteries or similar energy storage devices. In embodiments, the energy storage device 452 may include one or more supercapacitors or ultracapacitors. In embodiments, the power management circuitry 450 may alter, adjust, or control the flow of energy from an external power source 454 to the energy storage device 452 and/or to the processor-based device 400. The power source 454 may include, but is not limited to, a solar power system, a commercial electric grid, a portable generator, an external energy storage device, or any combination thereof.

For convenience, the processor circuitry 410, the storage device 460, the system memory 740, the source device/GPU circuitry 110, the wireless I/O interface 420, the wired I/O interface 430, the power management circuitry 450, and the network interface 470 are illustrated as communicatively coupled to each other via the bus 416, thereby providing connectivity between the above-described components. In alternative embodiments, the above-described components may be communicatively coupled in a different manner than illustrated in FIG. 4. For example, one or more of the above-described components may be directly coupled to other components, or may be coupled to each other, via one or more intermediary components (not shown). In another example, one or more of the above-described components may be integrated into the processor circuitry 410 and/or the graphics processor circuitry 412. In some embodiments, all or a portion of the bus 416 may be omitted and the components are coupled directly to each other using suitable wired or wireless connections.

Figure 5:
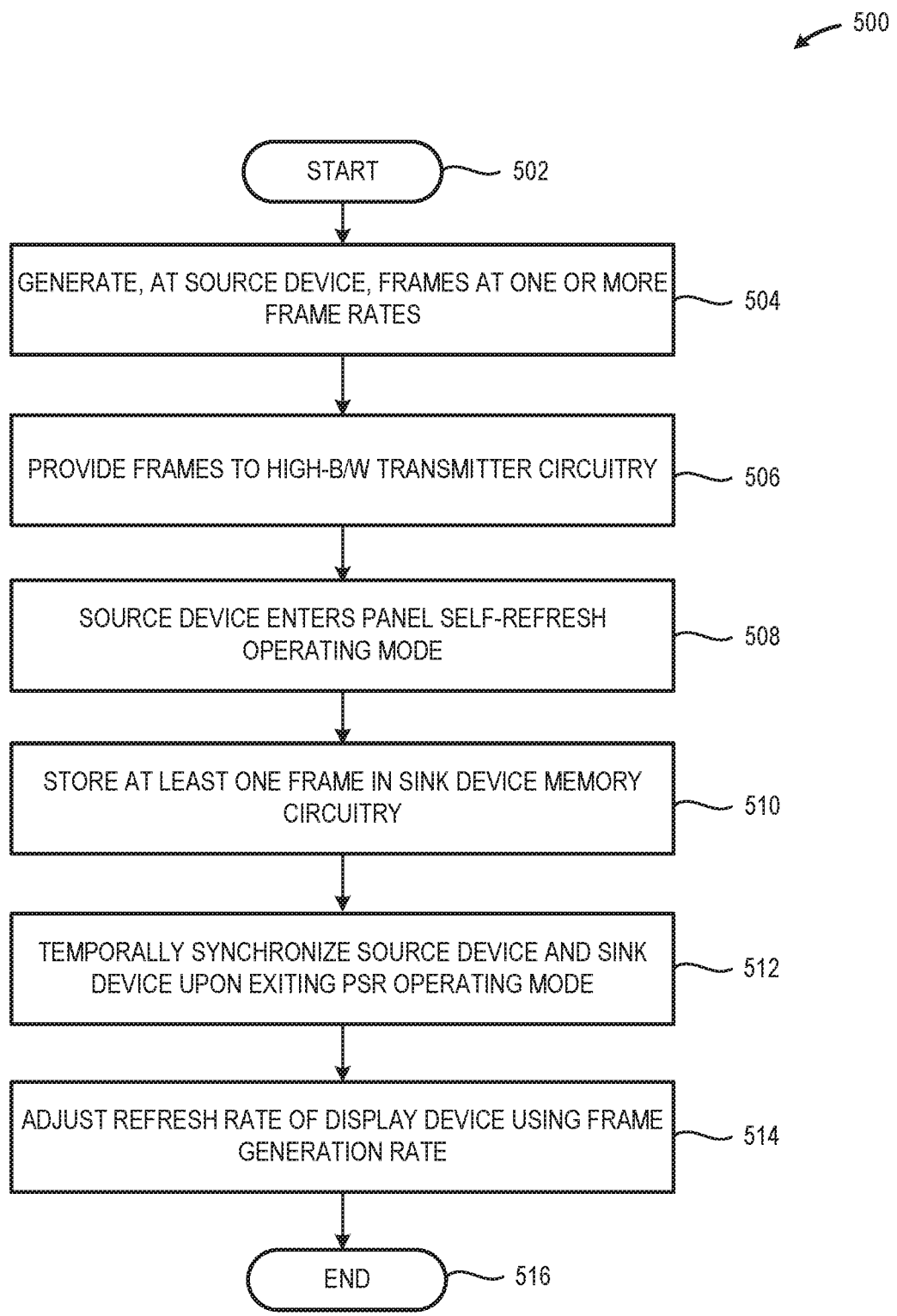
FIG. 5 is a high-level block flow diagram of an illustrative method that communicatively couples a source device having Panel Self-Refresh (PSR/PSR2) equipped source control circuitry with a sink device having adaptive synchronization equipped sink control circuitry, in accordance with at least one embodiment described herein.

FIG. 5 is a high-level block flow diagram of an illustrative method 500 that communicatively couples a source device 110 having Panel Self-Refresh (PSR/PSR2) equipped source control circuitry 120 with a sink device 150 having adaptive synchronization equipped sink control circuitry 160, in accordance with at least one embodiment described herein. The method 500 commences at 502.

At 504, the graphics circuitry 112 disposed in the source device 110 generates a plurality of frames 132A-132n. In embodiments, each of the frames 132 may have the same or a different frame generation rate.

At 506, the source control circuitry 120 causes the graphics circuitry 112 to transfer the frames 132A-132n to the high-bandwidth transmitter circuit 114 for transmission, via the high-bandwidth communications link 130, to the high-bandwidth receiver circuit 154 in the sink device 150. The sink control circuitry 160 attempts to synchronize the frame refresh rate of a display device 152, such as an OLED display, to the frame generation rate of the source device 110.

At 508, the source control circuitry 120 places the system into a Panel Self Refresh (PSR/PSR2) operating mode in response to detecting unchanging (PSR) or minimally changing (PSR2) image data included in each of a plurality of frames generated by the graphics circuitry 112. In the PSR/PSR2 operating mode, the high-bandwidth transmitter circuit 114, the high-bandwidth receiver circuit 154, and the high-bandwidth communications link 130 may be placed in a standby or similar low-power consumption mode. When the high-bandwidth communications link 130 is placed in standby mode, temporal synchronization between the source control circuitry 120 and the sink control circuitry 160 via the high-bandwidth communications link 130 may be impacted or even interrupted completely.

At 510, in response to entering the PSR/PSR2 operating mode, the sink control circuitry 160 causes a storage of at least one frame in the frame buffer circuitry 172 disposed in the sink device 150. The sink control circuitry 160 will continue to display the image stored in the frame buffer circuitry 172 for at least a portion of the duration of the PSR/PSR2 operating mode.

At 512, the source control circuitry 120 and/or the sink control circuitry 160 temporally synchronize the source device 110 and the sink device 150 in response to exiting the PSR/PSR2 operating mode. In embodiments, the source device 110 and the sink device 150 may maintain temporal synchronization contemporaneous with all or a portion of the PSR/PSR2 operating mode. In other embodiments, the source device 110 and the sink device 150 may lose temporal synchronization during at least a portion of the PSR/PSR2 operating mode and may re-synchronize after exiting the PSR/PSR2 operating mode.

At 514, the sink control circuitry 160 adjusts the refresh rate of the communicatively coupled display device 152 based, at least in part, on the frame generation rate of the source device 110. The method 500 concludes at 516.

Figure 6:
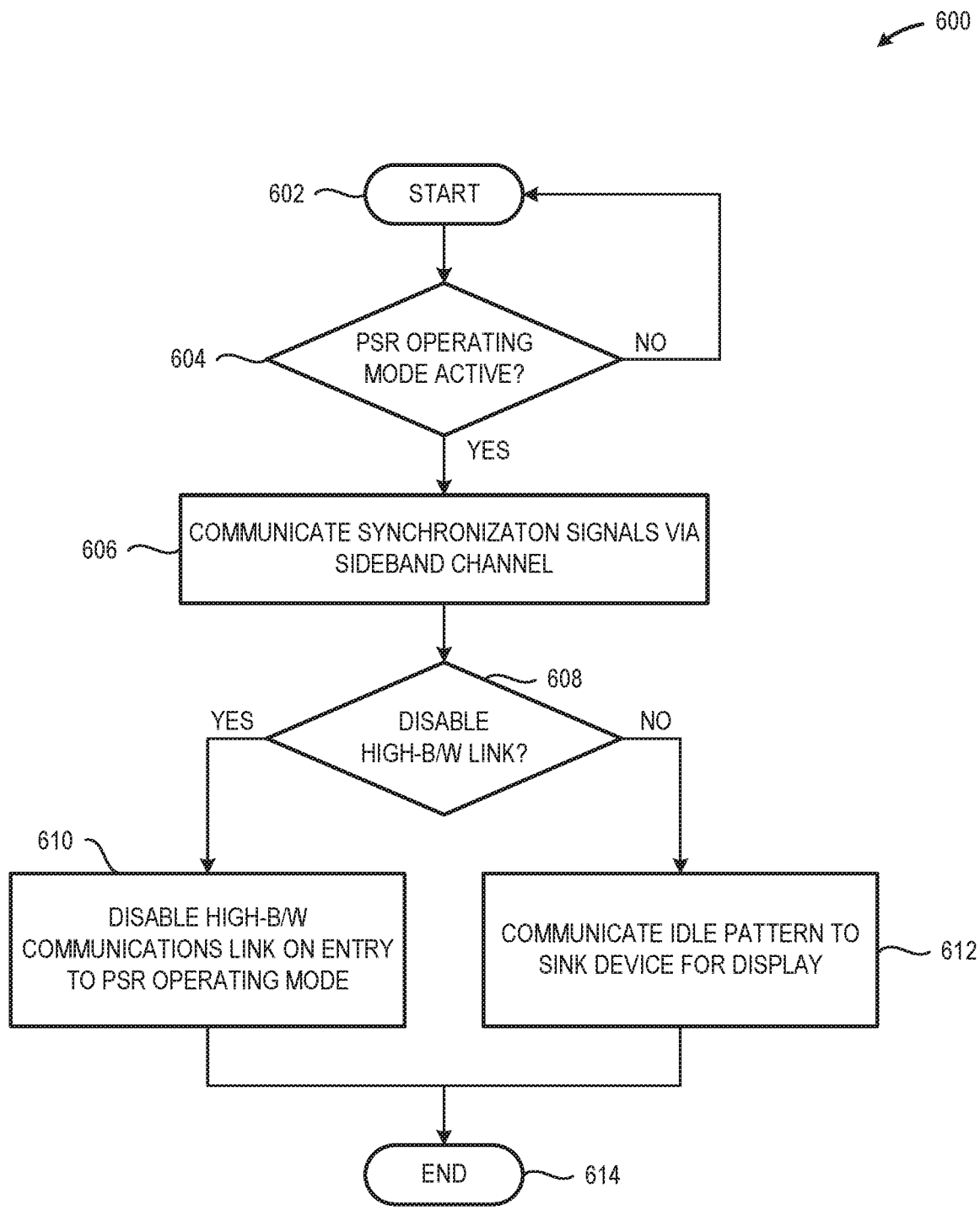
FIG. 6 is a high-level flow diagram of an illustrative method of maintaining temporal synchronization between a source device and a sink device contemporaneous with at least a portion of the PSR/PSR2 operating mode, in accordance with at least one embodiment described herein.

FIG. 6 is a high-level flow diagram of an illustrative method 600 of maintaining temporal synchronization between a source device 110 and a sink device 150 contemporaneous with at least a portion of the PSR/PSR2 operating mode, in accordance with at least one embodiment described herein. The method 600 may be used in conjunction with the method 500 depicted in FIG. 5. The method 600 commences at 602.

At 604, the source control circuitry 120 and/or the sink control circuitry 160 determines whether the system has been placed in the PSR/PSR2 operating mode. Responsive to a determination that the system has not been placed in PSR/PSR2 operating mode, the method 600 returns to 602.

At 606, responsive to a determination that the system has been placed in PSR/PSR2 operating mode, the source control circuitry 120 and/or the sink control circuitry 160 may communicate synchronization signals via one or more sideband channels. In some implementations, the source control circuitry 120 and/or the sink control circuitry 160 may establish a sideband connection via the side-channel transceiver circuitry 116, the side-channel transceiver circuitry 156, and the low bandwidth communications link 140.

At 608, the source control circuitry 120 determines whether to place the high-bandwidth communications link 130 in a standby or low power consumption mode. Responsive to a determination that the high-bandwidth communications link 130 should be placed in a standby or low power consumption mode, the method 600 continues at 610. Responsive to a determination that the high-bandwidth communications link 130 should not be placed in a standby or low power consumption mode, the method 600 continues at 612.

At 610, the source control circuitry 120 places the high-bandwidth communications link 130 in a standby or low power consumption mode. The method 600 concludes at 614.

At 612, the source control circuitry 120 maintains the high-bandwidth communications link 130 and generates an idle pattern image for transmission to the sink device 150. The method 600 concludes at 614.

Figure 7:
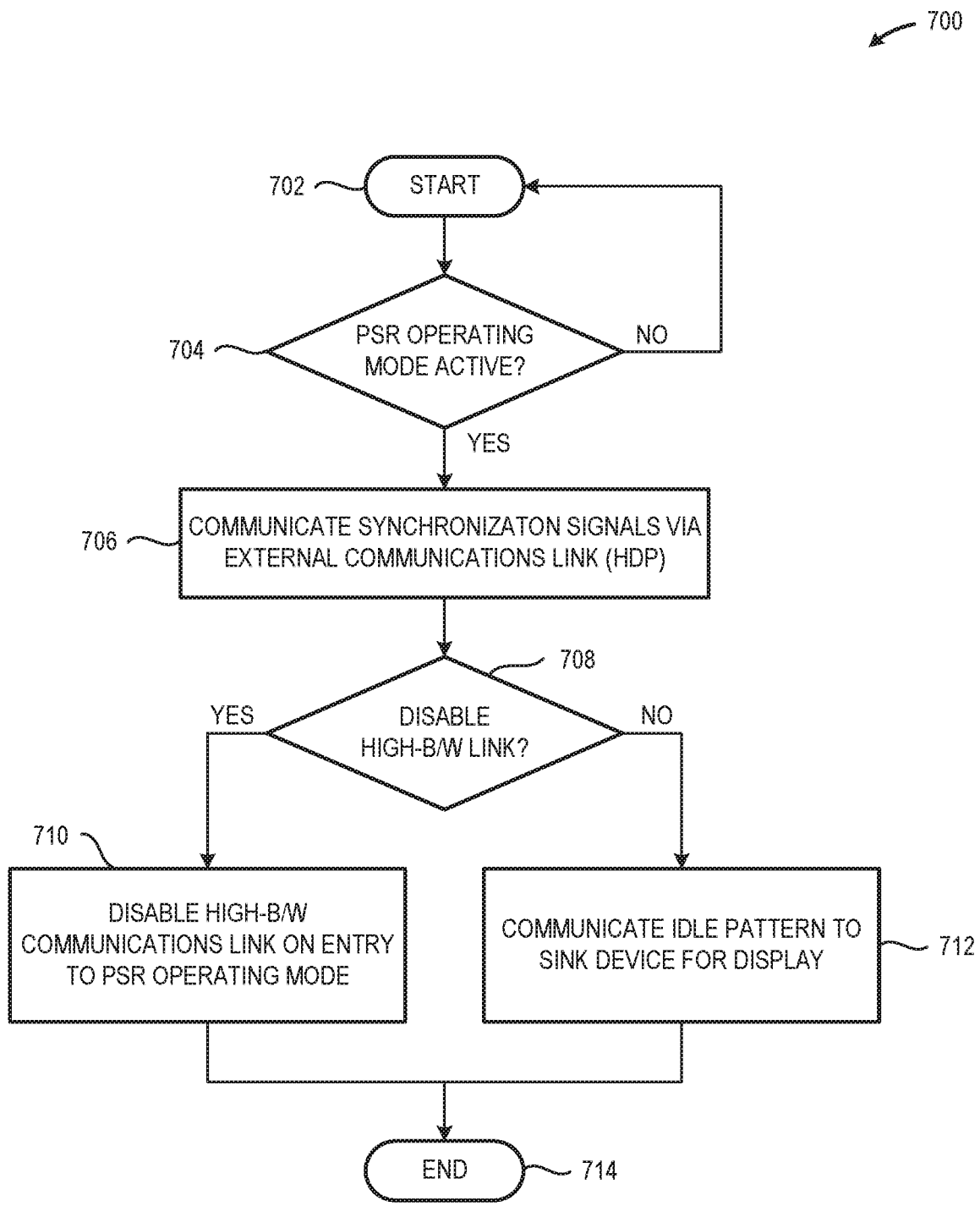
FIG. 7 is a high-level flow diagram of an illustrative method of maintaining temporal synchronization between a source device and a sink device contemporaneous with at least a portion of the PSR/PSR2 operating mode, in accordance with at least one embodiment described herein.

FIG. 7 is a high-level flow diagram of an illustrative method 700 of maintaining temporal synchronization between a source device 110 and a sink device 150 contemporaneous with at least a portion of the PSR/PSR2 operating mode, in accordance with at least one embodiment described herein. The method 700 may be used in conjunction with the method 500 depicted in FIG. 5. The method 700 commences at 702.

At 704, the source control circuitry 120 and/or the sink control circuitry 160 determines whether the system has been placed in the PSR/PSR2 operating mode. Responsive to a determination that the system has not been placed in PSR/PSR2 operating mode, the method 700 returns to 702.

At 706, responsive to a determination that the system has been placed in PSR/PSR2 operating mode, the source control circuitry 120 and/or the sink control circuitry 160 may communicate synchronization signals via one or more sideband channels, such as via bidirectional FS_HDP.

At 708, the source control circuitry 120 determines whether to place the high-bandwidth communications link 130 in a standby or low power consumption mode. Responsive to a determination that the high-bandwidth communications link 130 should be placed in a standby or low power consumption mode, the method 700 continues at 710. Responsive to a determination that the high-bandwidth communications link 130 should not be placed in a standby or low power consumption mode, the method 700 continues at 712.

At 710, the source control circuitry 120 places the high-bandwidth communications link 130 in a standby or low power consumption mode. The method 700 concludes at 714.

At 712, the source control circuitry 120 maintains the high-bandwidth communications link 130 and generates an idle pattern image for transmission to the sink device 150. The method 700 concludes at 714.

Figure 8:
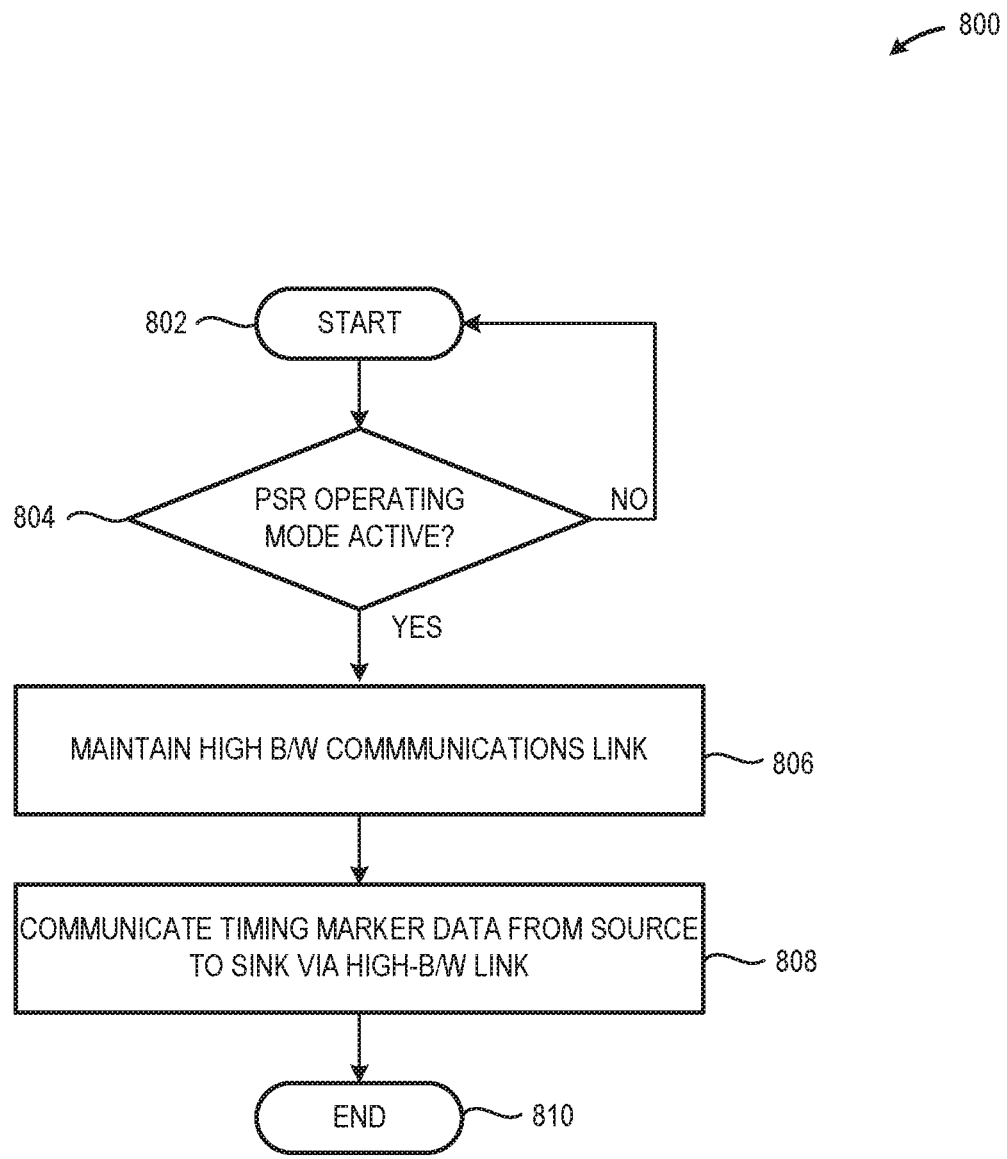
FIG. 8 is a high-level flow diagram of an illustrative method of maintaining temporal synchronization between a source device and a sink device contemporaneous with at least a portion of the PSR/PSR2 operating mode, in accordance with at least one embodiment described herein.

FIG. 8 is a high-level flow diagram of an illustrative method 800 of maintaining temporal synchronization between a source device 110 and a sink device 150 contemporaneous with at least a portion of the PSR/PSR2 operating mode, in accordance with at least one embodiment described herein. The method 800 may be used in conjunction with the method 500 depicted in FIG. 5. The method 800 commences at 802.

At 804, the source control circuitry 120 and/or the sink control circuitry 160 determines whether the system has been placed in the PSR/PSR2 operating mode. Responsive to a determination that the system has not been placed in PSR/PSR2 operating mode, the method 800 returns to 802. Responsive to a determination that the system has been placed in PSR/PSR2 operating mode, the method 800 continues to 806.

At 806, responsive to a determination that the system has been placed in PSR/PSR2 operating mode, the source control circuitry 120 maintains the high-bandwidth communications link 130 linking the high-bandwidth transmitter circuit 114 with the high-bandwidth receiver circuit 154.

At 808, the source control circuitry 120 communicates timing marker data to the sink device 150 to maintain synchronization between the source device and the sink device. The method 800 concludes at 810.

Figure 9:
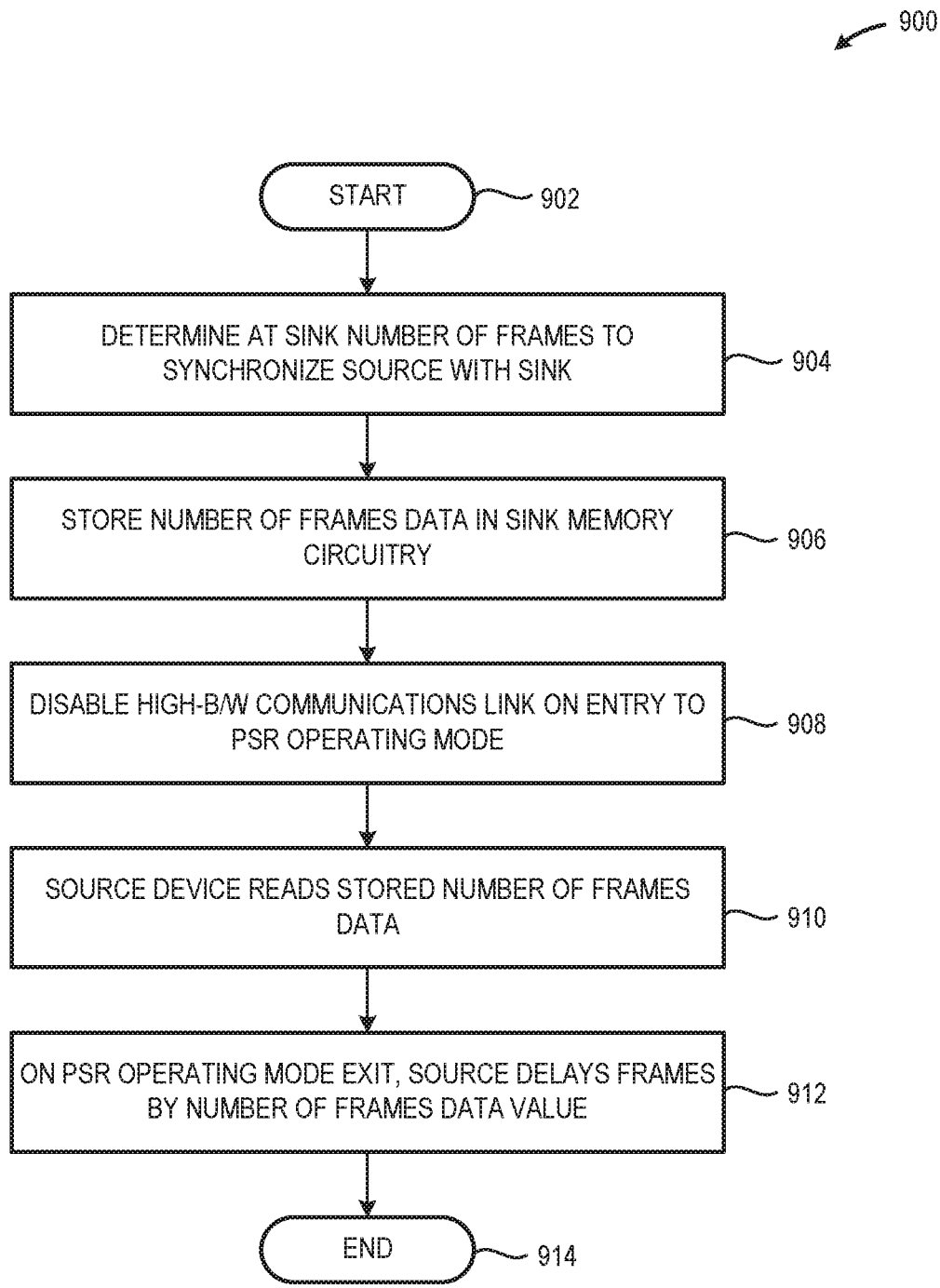
FIG. 9 is a high-level flow diagram of an illustrative method of resynchronizing a source device and a sink device upon exiting the PSR/PSR2 operating mode, in accordance with at least one embodiment described herein.

FIG. 9 is a high-level flow diagram of an illustrative method 900 of resynchronizing a source device 110 and a sink device 150 upon exiting the PSR/PSR2 operating mode, in accordance with at least one embodiment described herein. The method 900 may be used in conjunction with the method 500 depicted in FIG. 5. The method 900 commences at 902.

At 904, the sink control circuitry 160 determines a duration and/or an equivalent number of frames needed to resynchronize the sink device 150 upon the system exiting the PSR/PSR2 operating mode.

At 906, the sink control circuitry 160 causes the storage of data and/or information indicative of the number of frames determined at 904 in one or more register circuits 174 included in memory circuitry local to the sink device 150.

At 908, the source control circuitry 120 places the system in a PSR/PSR2 operating mode in which the high-bandwidth transmitter circuit 114, high-bandwidth receiver circuit 154, and high-bandwidth communications link 130 are placed in a standby or similar low power consumption operating mode.

At 910, responsive to exiting the PSR/PSR2 operating mode, the source control circuitry 120 reads the data indicative of the number of frames in the one or more register circuits 174 included in memory circuitry local to the sink device 150.

At 912, to re-synchronize the source device 110 with the sink device 150, the source control circuitry 120 causes a delay equal to the number of frames received at 910. The method 900 concludes at 914.

While FIGS. 5, 6, 7, 8, and 9 illustrate various operations according to one or more embodiments, it is to be understood that not all of the operations depicted in FIGS. 5, 6, 7, 8, and 9 are necessary for other embodiments. Indeed, it is fully contemplated herein that in other embodiments of the present disclosure, the operations depicted in FIGS. 5, 6, 7, 8, and 9 and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C.

As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices.

As used in any embodiment herein, the term "circuitry" may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more mediums (e.g., non-transitory storage mediums) having stored therein, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

Thus, the present disclosure is directed to systems and methods of maintaining source device to sink device synchronization in systems in which the source device enters a Panel Self-Refresh (PSR/PSR2) mode and the sink device enables adaptive synchronization with the source device. To maintain synchronization, in some instances the source device and the sink device may maintain synchronization contemporaneous with at least a portion of the PSR/PSR2 operating mode. To maintain synchronization, in some instances, a high-bandwidth communications link may be maintained between the source device and the sink device. In some instances, synchronization between the source device and the sink device may be interrupted upon the source device entering the PSR/PSR2 operating mode and may be re-established upon the source device exiting the PSR/PSR2 operating mode.

The following examples pertain to further embodiments. The following examples of the present disclosure may comprise subject material such as at least one device, a method, at least one machine-readable medium for storing instructions that when executed cause a machine to perform acts based on the method, means for performing acts based on the method and/or a system for maintaining source device to sink device synchronization in systems in which the source device enters a Panel Self-Refresh (PSR/PSR2) mode and the sink device enables adaptive synchronization with the source device.

According to example 1, there is provided a data transmission system. The system may include: a source device comprising: high-bandwidth transmitter circuitry; sideband transceiver circuitry; control circuitry to: generate a plurality of frames at one or more frame generation rates; provide the plurality of frames to the high-bandwidth transmitter circuitry; disable at least the high-bandwidth transmitter circuitry responsive to entering a Panel Self-Refresh (PSR) operating mode; synchronize the source device and the sink device responsive to exiting the PSR operating mode; and adjust, by the sink device control circuitry. The system may additionally include: high-bandwidth receiver circuitry to receive the plurality of frames from the source device; sideband transceiver circuitry communicatively coupled to the source device sideband transceiver circuitry; memory circuitry; control circuitry to: cause a storage of at least one frame included in the plurality of frames in the memory circuitry; and adjust a refresh rate of a communicatively coupled display device to the frame generation rate of the source device.

Example 2 may include elements of example 1 and the system may further include: a high-bandwidth communications link to communicatively couple the source device high-bandwidth transmitter circuitry to the sink device high-bandwidth receiver circuitry.

Example 3 may include elements of any of examples 1 or 2 and the sink device control circuitry to further: cause a display of the at least one frame in the memory circuitry responsive to the source device entering the PSR operating mode.

Example 4 may include elements of any of examples 1 through 3 where to adjust a refresh rate of a communicatively coupled display device, the sink device control circuitry to: adjust a duration of a respective vertical blank (VB) interval associated with each frame included in the plurality of frames over a defined VB range.

Example 5 may include elements of any of examples 1 through 4 where to synchronize the source device and the sink device responsive to exiting the PSR operating mode, the source control circuitry to further: communicate, via the source device sideband transceiver circuitry, one or more timing signals to the sink device sideband transceiver circuitry, the one or more timing signals to maintain a frame-level temporal synchronization between the source device and the sink device.

Example 6 may include elements of any of examples 1 through 5 where the source device control circuitry to further: disable the high-bandwidth communications link responsive to entering the PSR operating mode.

Example 7 may include elements of any of examples 1 through 6 where the source device control circuitry to further: communicate data representative of an idle pattern to the sink device via the high-bandwidth communications link responsive to entering the PSR operating mode.

Example 8 may include elements of any of examples 1 through 7 where to synchronize the source device and the sink device responsive to exiting the PSR operating mode, the source control circuitry to further: bidirectionally communicate, via a second sideband communications link, one or more timing signals to the sink device, the one or more timing signals to maintain a frame-level temporal synchronization between the source device and the sink device.

Example 9 may include elements of any of examples 1 through 8, the source device control circuitry to further: disable the high-bandwidth communications link responsive to entering the PSR operating mode.

Example 10 may include elements of any of examples 1 through 9, the source device control circuitry to further: communicate data representative of an idle pattern to the sink device via the high-bandwidth communications link responsive to entering the PSR operating mode.

Example 11 may include elements of any of examples 1 through 10 where to synchronize the source device and the sink device responsive to exiting the PSR operating mode, the source control circuitry to further: determine, using a universal time standard, a Presentation Time Stamp (PTS) value associated with a frame; and communicate, via the high-bandwidth communications link and in response to exiting the PSR operating mode, the frame having associated therewith the PTS value to maintain a frame-level temporal synchronization between the source device and the sink device.

Example 12 may include elements of any of examples 1 through 11 where the source device control circuitry to further: disable the high-bandwidth communications link responsive to entering the PSR operating mode.

Example 13 may include elements of any of examples 1 through 12, the source device control circuitry to further: communicate data representative of an idle pattern to the sink device via the high-bandwidth communications link responsive to entering the PSR operating mode.

Example 14 may include elements of any of examples 1 through 13 where to synchronize the source device and the sink device responsive to exiting the PSR operating mode, the source control circuitry to further: maintain the high-bandwidth communications link responsive to entering the PSR operating mode; and communicate, via the high-bandwidth communications link for the duration of the PSR operating mode, to the sink device at least one of: line timing marker data to maintain a line-level temporal synchronization between the source device and the sink device or frame timing marker data to maintain a frame-level temporal synchronization between the source device and the sink device.

Example 15 may include elements of any of examples 1 through 14 where the sink device control circuitry may further: determine a number of frames to display to resynchronize sink device timing with source device timing upon exiting the PSR operating mode; store a value indicative of the determined number of frames in a sink device memory register circuit; wherein to synchronize the source device and the sink device responsive to exiting the PSR operating mode, the source control circuitry to further: disable the high-bandwidth communications link responsive to entering the PSR operating mode; responsive to exiting the PSR operating mode, read the value indicative of the determined number of frames in the sink device memory register circuit;

and resynchronize the source device control circuitry with the sink device control circuitry responsive to exiting the PSR operating mode.

According to example 16, there is provided a data transmission method. The method may include: generating, by source device graphics circuitry, a plurality of frames at one or more frame generation rates; providing, by source device control circuitry, each of the plurality of frames to high-bandwidth transmitter circuitry; disabling, by the source device control circuitry, at least the high-bandwidth transmitter circuitry responsive to entering a Panel Self-Refresh (PSR) operating mode; causing, by sink device control circuitry, a storage of at least one frame included in the plurality of frames in sink device memory circuitry; temporally synchronizing the source device and the sink device responsive to exiting the PSR operating mode; and adjusting, by the sink device control circuitry, a refresh rate of a communicatively coupled display device to the frame generation rate of the source device.

Example 17 may include elements of example 16 and the method may further include: causing, by the sink device control circuitry, a display of the at least one frame in the memory circuitry responsive to an entry of the source device into the PSR operating mode.

Example 18 may include elements of any of examples 16 or 17 where adjusting the refresh rate of the communicatively coupled display device to the frame generation rate of the source device further comprising: adjusting, by the sink device control circuitry, a duration of a respective vertical blank (VB) interval associated with each frame included in the plurality of frames over a defined VB range.

Example 19 may include elements of any of examples 16 through 18 where temporally synchronizing the source device and the sink device responsive to exiting the PSR operating mode further comprises: communicating, by source device sideband transceiver circuitry, one or more timing signals to the sink device sideband transceiver circuitry contemporaneous with at least a portion of the PSR operating mode, the one or more timing signals to maintain a frame-level temporal synchronization between the source device and the sink device.

Example 20 may include elements of any of examples 16 through 19 where temporally synchronizing the source device and the sink device responsive to exiting the PSR operating mode further comprises: disabling, by the source device control circuitry, a high-bandwidth communications link between the source device and the sink device responsive to entering the PSR operating mode.

Example 21 may include elements of any of examples 16 through 20 where temporally synchronizing the source device and the sink device responsive to exiting the PSR operating mode further comprises: communicating, by the source device control circuitry, data representative of an idle pattern to the sink device via a high-bandwidth communications link between the source device and the sink device responsive to entering the PSR operating mode.

Example 22 may include elements of any of examples 16 through 21 where temporally synchronizing the source device and the sink device responsive to exiting the PSR operating mode further comprises: bidirectionally communicating, by the source device control circuitry via a sideband communications link, one or more timing signals to the sink device, the one or more timing signals to maintain a frame-level temporal synchronization between the source device and the sink device.

Example 23 may include elements of any of examples 16 through 22 where temporally synchronizing the source device and the sink device responsive to exiting the PSR operating mode further comprises: disabling, by the source device control circuitry, a high-bandwidth communications link between the source device and the sink device responsive to entering the PSR operating mode.

Example 24 may include elements of any of examples 16 through 23 where temporally synchronizing the source device and the sink device responsive to exiting the PSR operating mode further comprises: communicating, by the source device control circuitry, data representative of an idle pattern to the sink device via a high-bandwidth communications link between the source device and the sink device responsive to entering the PSR operating mode.

Example 25 may include elements of any of examples 16 through 24 temporally synchronizing the source device and the sink device responsive to exiting the PSR operating mode further comprises: determining, by the source device control circuitry, a universal Presentation Time Stamp (PTS) value associated with a frame; and communicating, the source device control circuitry via the high-bandwidth communications link between the source device and the sink device, and in response to exiting the PSR operating mode, the frame having associated therewith the PTS value to maintain a frame-level temporal synchronization between the source device and the sink device.

Example 26 may include elements of any of examples 16 through 25 where temporally synchronizing the source device and the sink device responsive to exiting the PSR operating mode further comprises: disabling, the source device control circuitry, a high-bandwidth communications link between the source device and the sink device responsive to entering the PSR operating mode.

Example 27 may include elements of any of examples 16 through 26 where temporally synchronizing the source device and the sink device responsive to exiting the PSR operating mode further comprises: communicating, by the source device control circuitry, data representative of an idle pattern to the sink device via a high-bandwidth communications link between the source device and the sink device responsive to entering the PSR operating mode.

Example 28 may include elements of any of examples 16 through 27 where temporally synchronizing the source device and the sink device responsive to exiting the PSR operating mode further comprises: maintaining, by the source device control circuitry, a high-bandwidth communications link between the source device and the sink device responsive to entering the PSR operating mode; and communicating, by the source device control circuitry via the high-bandwidth communications link to the sink device for the duration of the PSR operating mode, at least one of: line timing marker data to maintain a line-level temporal synchronization between the source device and the sink device or frame timing marker data to maintain a frame-level temporal synchronization between the source device and the sink device.

Example 29 may include elements of any of examples 16 through 28 where temporally synchronizing the source device and the sink device responsive to exiting the PSR operating mode further comprises: determining, by the sink device control circuitry, a number of frames to display to resynchronize sink device timing with source device timing upon exiting the PSR operating mode; storing, by the sink device control circuitry, a value indicative of the determined number of frames in a sink device memory register circuit; disabling, by the source device control circuitry, a high-bandwidth communications link between the source device and the sink device responsive to entering the PSR operating mode; reading, by the source device control circuitry, the value indicative of the determined number of frames in the sink device memory register circuit responsive to exiting the PSR operating mode; and resynchronizing the source device control circuitry with the sink device control circuitry responsive to exiting the PSR operating mode.

According to example 30, there is provided a non-transitory storage device. The non-transitory storage device may include instructions that, when executed by circuitry, causes the control circuitry to: cause graphics circuitry to generate a plurality of frames at one or more frame generation rates; provide each of the plurality of frames to high-bandwidth transmitter circuitry; and disable at least the high-bandwidth transmitter circuitry responsive to entering a Panel Self-Refresh (PSR) operating mode; cause a storage of at least one frame included in the plurality of frames in sink device memory circuitry; temporally synchronize the source device and the sink device responsive to exiting the PSR operating mode; and adjust a refresh rate of a communicatively coupled display device to the frame generation rate of the source device.

Example 31 may include elements of example 30 where the instructions further cause the control circuitry to: cause the sink device control circuitry to display of the at least one frame in the memory circuitry responsive to an entry of the source device into the PSR operating mode.

Example 32 may include elements of any of examples 30 or 31 where the instructions that cause the control circuitry to cause the sink control circuitry to adjust the refresh rate of the communicatively coupled display device to the frame generation rate of the source device further comprising: cause the sink control circuitry to adjust a duration of a respective vertical blank (VB) interval associated with each frame included in the plurality of frames over a defined VB range.

Example 33 may include elements of any of examples 30 through 32 where the instructions that cause the control circuitry to temporally synchronize the source device and the sink device responsive to exiting the PSR operating mode further cause the control circuitry to: cause the source device sideband transceiver circuitry to communicate one or more timing signals to the sink device sideband transceiver circuitry contemporaneous with at least a portion of the PSR operating mode, the one or more timing signals to maintain a frame-level temporal synchronization between the source device and the sink device.

Example 34 may include elements of any of examples 30 through 33 where the instructions that cause the control circuitry to temporally synchronize the source device and the sink device responsive to exiting the PSR operating mode further cause the control circuitry to: cause the source device control circuitry to disable a high-bandwidth communications link between the source device and the sink device responsive to entering the PSR operating mode.

Example 35 may include elements of any of examples 30 through 34 where the instructions that cause the control circuitry to temporally synchronize the source device and the sink device responsive to exiting the PSR operating mode further cause the control circuitry to: cause the source device control circuitry to communicate data representative of an idle pattern to the sink device via a high-bandwidth communications link between the source device and the sink device responsive to entering the PSR operating mode.

Example 36 may include elements of any of examples 30 through 35 where the instructions that cause the control circuitry to temporally synchronize the source device and the sink device responsive to exiting the PSR operating mode further cause the control circuitry to: cause the source device control circuitry to bidirectionally communicate, via a sideband communications link, one or more timing signals to the sink device, the one or more timing signals to maintain a frame-level temporal synchronization between the source device and the sink device.

Example 37 may include elements of any of examples 30 through 36 where the instructions that cause the control circuitry to temporally synchronize the source device and the sink device responsive to exiting the PSR operating mode further cause the control circuitry to: cause the source device control circuitry to disable a high-bandwidth communications link between the source device and the sink device responsive to entering the PSR operating mode.

Example 38 may include elements of any of examples 30 through 37 where the instructions that cause the control circuitry to temporally synchronize the source device and the sink device responsive to exiting the PSR operating mode further causes the control circuitry to: cause the source device control circuitry to communicate data representative of an idle pattern to the sink device via a high-bandwidth communications link between the source device and the sink device responsive to entering the PSR operating mode.

Example 39 may include elements of any of examples 30 through 38 where the instructions that cause the control circuitry to temporally synchronize the source device and the sink device responsive to exiting the PSR operating mode further cause the control circuitry to: cause the source device control circuitry to determine a universal Presentation Time Stamp (PTS) value associated with a frame; and cause the source device control circuitry to communicate, via the high-bandwidth communications link between the source device and the sink device, the frame having associated therewith the PTS value to maintain a frame-level temporal synchronization between the source device and the sink device.

Example 40 may include elements of any of examples 30 through 39 where the instructions that cause the control circuitry to temporally synchronize the source device and the sink device responsive to exiting the PSR operating mode further cause the control circuity to: cause the source device control circuitry to disable a high-bandwidth communications link between the source device and the sink device responsive to entering the PSR operating mode.

Example 41 may include elements of any of examples 30 through 40 where the instructions that cause the control circuitry to temporally synchronize the source device and the sink device responsive to exiting the PSR operating mode further cause the control circuitry to: cause the source device control circuitry to communicate data representative of an idle pattern to the sink device via a high-bandwidth communications link between the source device and the sink device responsive to entering the PSR operating mode.

Example 42 may include elements of any of examples 30 through 41 where the instructions that cause the control circuitry to temporally synchronize the source device and the sink device responsive to exiting the PSR operating mode further cause the control circuitry to: cause the source device control circuitry to maintain a high-bandwidth communications link between the source device and the sink device responsive to entering the PSR operating mode and cause the source device control circuitry to communicate, via the high-bandwidth communications link to the sink device for the duration of the PSR operating mode, at least one of: line timing marker data to maintain a line-level temporal synchronization between the source device and the sink device or frame timing marker data to maintain a frame-level temporal synchronization between the source device and the sink device.

Example 43 may include elements of any of examples 30 through 42 where the instructions that cause the control circuitry to temporally synchronize the source device and the sink device responsive to exiting the PSR operating mode further cause the control circuitry to: cause the sink device control circuitry to determine a number of frames to display to resynchronize sink device timing with source device timing upon exiting the PSR operating mode; cause the sink device control circuitry to store a value indicative of the determined number of frames in a sink device memory register circuit; cause the source device control circuitry to disable a high-bandwidth communications link between the source device and the sink device responsive to entering the PSR operating mode; cause the source device control circuitry to read the value indicative of the determined number of frames in the sink device memory register circuit responsive to exiting the PSR operating mode; and cause source device control circuitry to resynchronize with the sink device control circuitry responsive to exiting the PSR operating mode.

According to example 44, there is provided an electronic device. The electronic device may include: a source device comprising: high-bandwidth transmitter circuitry; sideband transceiver circuitry; graphics circuitry; control circuitry to: generate a plurality of frames at one or more frame generation rates; provide the plurality of frames to the high-bandwidth transmitter circuitry; disable at least the high-bandwidth transmitter circuitry responsive to entering a Panel Self-Refresh (PSR) operating mode; synchronize the source device and the sink device responsive to exiting the PSR operating mode; a sink device comprising: a display device high-bandwidth receiver circuitry to receive the plurality of frames from the source device; sideband transceiver circuitry communicatively coupled to the source device sideband transceiver circuitry; memory circuitry; control circuitry to: cause a storage of at least one frame included in the plurality of frames in the memory circuitry; and adjust a refresh rate of a communicatively coupled display device to the frame generation rate of the source device; and a housing disposed at least partially about the source device and the sink device.

Example 45 may include elements of example 44 and the electronic device may further include: a high-bandwidth communications link to communicatively couple the source device high-bandwidth transmitter circuitry to the sink device high-bandwidth receiver circuitry.

Example 46 may include elements of any of examples 44 or 45 wherein the sink device control circuitry may further: cause a display of the at least one frame in the memory circuitry responsive to the source device entering the PSR operating mode.

Example 47 may include elements of any of examples 44 through 46 where, to adjust a refresh rate of a communicatively coupled display device, the sink device control circuitry may: adjust a duration of a respective vertical blank (VB) interval associated with each frame included in the plurality of frames over a defined VB range.

Example 48 may include elements of any of examples 44 through 47 where to synchronize the source device and the sink device responsive to exiting the PSR operating mode, the source control circuitry may: communicate, via the source device sideband transceiver circuitry, one or more timing signals to the sink device sideband transceiver circuitry, the one or more timing signals to maintain a frame-level temporal synchronization between the source device and the sink device.

Example 49 may include elements of any of examples 44 through 48 where the source device control circuitry may further: disable the high-bandwidth communications link responsive to entering the PSR operating mode.

Example 50 may include elements of any of examples 44 through 49 where the source device control circuitry may further: communicate data representative of an idle pattern to the sink device via the high-bandwidth communications link responsive to entering the PSR operating mode.

Example 51 may include elements of any of examples 44 through 50 where, to synchronize the source device and the sink device responsive to exiting the PSR operating mode, the source control circuitry may further: bidirectionally communicate, via a second sideband communications link, one or more timing signals to the sink device, the one or more timing signals to maintain a frame-level temporal synchronization between the source device and the sink device.

Example 52 may include elements of any of examples 44 through 51 where the source device control circuitry may further: disable the high-bandwidth communications link responsive to entering the PSR operating mode.

Example 53 may include elements of any of examples 44 through 52 where the source device control circuitry may further: communicate data representative of an idle pattern to the sink device via the high-bandwidth communications link responsive to entering the PSR operating mode.

Example 54 may include elements of any of examples 44 through 53 where to synchronize the source device and the sink device responsive to exiting the PSR operating mode, the source control circuitry may further: determine, using a universal time standard, a Presentation Time Stamp (PTS) value associated with a frame; and communicate, via the high-bandwidth communications link and in response to exiting the PSR operating mode, the frame having associated therewith the PTS value to maintain a frame-level temporal synchronization between the source device and the sink device.

Example 55 may include elements of any of examples 44 through 54 where the source device control circuitry may further: disable the high-bandwidth communications link responsive to entering the PSR operating mode.

Example 56 may include elements of any of examples 44 through 55 where the source device control circuitry may further: communicate data representative of an idle pattern to the sink device via the high-bandwidth communications link responsive to entering the PSR operating mode.

Example 57 may include elements of any of examples 44 through 56 where to synchronize the source device and the sink device responsive to exiting the PSR operating mode, the source control circuitry may further: maintain the high-bandwidth communications link responsive to entering the PSR operating mode; and communicate, via the high-bandwidth communications link for the duration of the PSR operating mode, to the sink device at least one of: line timing marker data to maintain a line-level temporal synchronization between the source device and the sink device or frame timing marker data to maintain a frame-level temporal synchronization between the source device and the sink device.

Example 58 may include elements of any of examples 44 through 57 where the sink device control circuitry may further: determine a number of frames to display to resynchronize sink device timing with source device timing upon exiting the PSR operating mode; store a value indicative of the determined number of frames in a sink device memory register circuit; wherein to synchronize the source device and the sink device responsive to exiting the PSR operating mode, the source control circuitry to further: disable the high-bandwidth communications link responsive to entering the PSR operating mode; responsive to exiting the PSR operating mode, read the value indicative of the determined number of frames in the sink device memory register circuit; and resynchronize the source device control circuitry with the sink device control circuitry responsive to exiting the PSR operating mode.

According to example 59, there is provided a system to maintaining source device to sink device synchronization in systems in which the source device enters a Panel Self-Refresh (PSR/PSR2) mode and the sink device enables adaptive synchronization with the source device, the system being arranged to perform the method of any of examples 16 through 29.

According to example 60, there is provided a chipset arranged to perform the method of any of examples 16 through 29.

According to example 61, there is provided at least one machine readable medium comprising a plurality of instructions that, in response to be being executed on a computing device, cause the computing device to carry out the method according to any of examples 16 through 29.

According to example 62, there is provided a device configured to maintaining source device to sink device synchronization in systems in which the source device enters a Panel Self-Refresh (PSR/PSR2) mode and the sink device enables adaptive synchronization with the source device, the device being arranged to perform the method of any of examples 16 through 29.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed:

1. A data transmission system, comprising:
   a sink device comprising:
      high-bandwidth receiver circuitry to receive a plurality of frames;
      sideband transceiver circuitry;
      memory circuitry;
      control circuitry to:
         cause a storage of at least one frame included in the plurality of frames in the memory circuitry; and
         adjust a refresh rate of a communicatively coupled display device to one or more frame generation rates; and
   a source device comprising:
      high-bandwidth transmitter circuitry to transmit the plurality of frames to the sink device high-bandwidth receiver circuitry;
      sideband transceiver circuitry communicatively coupled to the sink device sideband transceiver circuitry; and
      control circuitry to:
         generate the plurality of frames at the one or more frame generation rates;
         provide the plurality of frames to the high-bandwidth transmitter circuitry;
         disable at least the high-bandwidth transmitter circuitry responsive to entering a Panel Self-Refresh (PSR) operating mode;
         synchronize the source device and the sink device responsive to exiting the PSR operating mode, wherein to synchronize the source and sink device, the control circuitry is to communicate, via the source device sideband transceiver circuitry, one or more timing signals to the sink device sideband transceiver circuitry, the one or more timing signals to maintain a frame-level temporal synchronization between the source device and the sink device; and
         communicate, via a high-bandwidth communications link that communicatively couples the source device high-bandwidth transmitter circuitry to the sink device high-bandwidth receiver circuitry, and in response to entering the PSR operating mode, data representative of an idle pattern.

2. The data transmission system of claim 1, wherein the sink device control circuitry is further to cause a display of the at least one frame in the memory circuitry responsive to the source device entering the PSR operating mode.

3. The data transmission system of claim 1 wherein, to adjust a refresh rate of a communicatively coupled display device, the sink device control circuitry is to adjust a duration of a respective vertical blank (VB) interval associated with each frame included in the plurality of frames over a defined VB range.

4. The data transmission system of claim 1:
   wherein to synchronize the source device and the sink device responsive to exiting the PSR operating mode, the source device control circuitry is to:
      bidirectionally communicate, via a second sideband communications link, one or more timing signals to the sink device, the one or more timing signals to maintain a frame-level temporal synchronization between the source device and the sink device.

5. The data transmission system of claim 1:
wherein to synchronize the source device and the sink device responsive to exiting the PSR operating mode, the source device control circuitry is to:
determine, using a universal time standard, a Presentation Time Stamp (PTS) value associated with a frame;
communicate, via the high-bandwidth communications link and in response to exiting the PSR operating mode, the frame having associated therewith the PTS value to maintain a frame-level temporal synchronization between the source device and the sink device.

6. The data transmission system of claim 1, wherein to synchronize the source device and the sink device responsive to exiting the PSR operating mode, the source device control circuitry is to communicate, via the high-bandwidth communications link for a duration of the PSR operating mode, to the sink device at least one of: line timing marker data to maintain a line-level temporal synchronization between the source device and the sink device or frame timing marker data to maintain a frame-level temporal synchronization between the source device and the sink device.

7. The data transmission system of claim 1:
wherein the sink device control circuitry to further:
determine a number of frames to display to resynchronize sink device timing with source device timing upon exiting the PSR operating mode;
store a value indicative of the determined number of frames in a sink device memory register circuit;
wherein to synchronize the source device and the sink device responsive to exiting the PSR operating mode, the source device control circuitry to further:
disable the high-bandwidth communications link responsive to entering the PSR operating mode;
responsive to exiting the PSR operating mode, read the value indicative of the determined number of frames in the sink device memory register circuit; and
resynchronize the source device control circuitry with the sink device control circuitry responsive to exiting the PSR operating mode.

8. A non-transitory storage device comprising instructions that, when executed by control circuitry, causes the control circuitry to:
cause graphics circuitry to generate a plurality of frames at one or more frame generation rates;
cause the graphics circuitry to provide each of the plurality of frames to high-bandwidth transmitter circuitry;
cause source device control circuitry and sink device control circuitry to enter a Panel Self-Refresh (PSR) operating mode;
cause sink device control circuitry to store at least one frame included in the plurality of frames in sink device memory circuitry;
cause source device control circuitry to temporally synchronize the source device and sink device responsive to exiting the PSR operating mode, wherein to temporally synchronize the source device and the sink device, the instructions further to cause the control circuitry to cause source device sideband transceiver circuitry to communicate one or more timing signals to sink device sideband transceiver circuitry contemporaneous with at least a portion of the PSR operating mode, the one or more timing signals to maintain a frame-level temporal synchronization between the source device and the sink device;
cause the source device control circuitry to communicate, via a high bandwidth communications link that communicatively couples source device high-bandwidth transmitter circuitry to sink device high-bandwidth receiver circuitry, and in response to entering the PSR operating mode, data representative of an idle pattern; and
cause sink device control circuitry to adjust a refresh rate of a communicatively coupled display device to the frame generation rate of the source device.

9. The non-transitory storage device of claim 8, wherein the instructions, when executed, cause the control circuitry to:
cause the sink device control circuitry to display of the at least one frame in the memory circuitry responsive to an entry of the source device into the PSR operating mode.

10. The non-transitory storage device of claim 8, wherein the instructions, when executed, cause the control circuitry to:
cause the sink device control circuitry to adjust a duration of a respective vertical blank (VB) interval associated with each frame included in the plurality of frames over a defined VB range.

11. The non-transitory storage device of claim 8:
wherein the instructions that cause the control circuitry to temporally synchronize the source device and the sink device responsive to exiting the PSR operating mode, when executed cause the control circuitry to cause the source device control circuitry to bidirectionally communicate, via a sideband communications link, one or more timing signals to the sink device, the one or more timing signals to maintain a frame-level temporal synchronization between the source device and the sink device.

12. The non-transitory storage device of claim 8:
wherein the instructions that cause the control circuitry to temporally synchronize the source device and the sink device responsive to exiting the PSR operating mode, when executed, cause the control circuitry to:
cause the source device control circuitry to determine a universal Presentation Time Stamp (PTS) value associated with a frame; and
cause the source device control circuitry to communicate, via the high-bandwidth communications link between the source device and the sink device, the frame having associated therewith the PTS value to maintain a frame-level temporal synchronization between the source device and the sink device.

13. The non-transitory storage device of claim 8 wherein the instructions that cause the control circuitry to temporally synchronize the source device and the sink device responsive to exiting the PSR operating mode, when executed cause the control circuitry to:
cause the source device control circuitry to communicate, via the high-bandwidth communications link to the sink device for a duration of the PSR operating mode, at least one of: line timing marker data to maintain a line-level temporal synchronization between the source device and the sink device or frame timing marker data to maintain a frame-level temporal synchronization between the source device and the sink device.

14. The non-transitory storage device of claim 8, wherein the instructions that cause the control circuitry to temporally synchronize the source device and the sink device responsive to exiting the PSR operating mode, when executed, cause the control circuitry to:

cause the sink device control circuitry to determine a number of frames to display to resynchronize sink device timing with source device timing upon exiting the PSR operating mode;
cause the sink device control circuitry to store a value indicative of the determined number of frames in a sink device memory register circuit;
cause the source device control circuitry to disable a high-bandwidth communications link between the source device and the sink device responsive to entering the PSR operating mode;
cause the source device control circuitry to read the value indicative of the determined number of frames in the sink device memory register circuit responsive to exiting the PSR operating mode; and
cause source device control circuitry to resynchronize with the sink device control circuitry responsive to exiting the PSR operating mode.

15. A data transmission method comprising:
generating, by source device graphics circuitry, a plurality of frames at one or more frame generation rates;
providing, by source device control circuitry, each of the plurality of frames to high-bandwidth transmitter circuitry;
disabling, by the source device control circuitry, at least the high-bandwidth transmitter circuitry responsive to entering a Panel Self-Refresh (PSR) operating mode;
causing, by sink device control circuitry, a storage of at least one frame included in the plurality of frames in sink device memory circuitry;
temporally synchronizing the source device and the sink device responsive to exiting the PSR operating mode, wherein temporally synchronizing the source device and the sink device includes communicating, by source device sideband transceiver circuitry, one or more timing signals to sink device sideband transceiver circuitry contemporaneous with at least a portion of the PSR operating mode, the one or more timing signals to maintain a frame-level temporal synchronization between the source device and the sink device;
communicating, via a high-bandwidth communications link that communicatively couples source device high-bandwidth transmitter circuitry to sink device high-bandwidth receiver circuitry, and in response to entering the PSR operating mode, data representative of an idle pattern; and
adjusting, by the sink device control circuitry, a refresh rate of a communicatively coupled display device to the frame generation rate of the source device.

16. The method of claim 15, further including causing, by the sink device control circuitry, a display of the at least one frame in the memory circuitry responsive to an entry of the source device into the PSR operating mode.

17. The method of claim 15 wherein adjusting the refresh rate of the communicatively coupled display device to the frame generation rate of the source device further including adjusting, by the sink device control circuitry, a duration of a respective vertical blank (VB) interval associated with each frame included in the plurality of frames over a defined VB range.

18. The method of claim 15 wherein temporally synchronizing the source device and the sink device responsive to exiting the PSR operating mode further including at least one of:
bidirectionally communicating, by the source device control circuitry via a sideband communications link, one or more timing signals to the sink device, the one or more timing signals to maintain a frame-level temporal synchronization between the source device and the sink device; or
determining, by the source device control circuitry, a universal Presentation Time Stamp (PTS) value associated with a frame and communicating, the source device control circuitry via the high-bandwidth communications link between the source device and the sink device, and in response to exiting the PSR operating mode, the frame having associated therewith the PTS value to maintain a frame-level temporal synchronization between the source device and the sink device.

19. A data transmission system, comprising:
means for generating a plurality of frames at one or more frame generation rates; means for providing each of the plurality of frames to high-bandwidth transmitter circuitry at a source device;
means for disabling at least the high-bandwidth transmitter circuitry responsive to entering a Panel Self-Refresh (PSR) operating mode;
means for causing a storage of at least one frame included in the plurality of frames in sink device memory circuitry;
means for temporally synchronizing the source device and the sink device responsive to exiting the PSR operating mode, wherein the means for temporally synchronizing the source device and the sink device is to communicate one or more timing signals to sink device sideband transceiver circuitry contemporaneous with at least a portion of the PSR operating mode, the one or more timing signals to maintain a frame-level temporal synchronization between the source device and the sink device;
means for communicating, via a high-bandwidth communications link that communicatively couples source device high-bandwidth transmitter circuitry to sink device high-bandwidth receiver circuitry, and in response to entering the PSR operating mode, data representative of an idle pattern; and
means for adjusting a refresh rate of a communicatively coupled display device to the frame generation rate of the source device.

20. The system of claim 19, further including:
means for causing a display of the at least one frame in the memory circuitry responsive to an entry of the source device into the PSR operating mode.

21. The system of claim 19 wherein the means for adjusting the refresh rate of the communicatively coupled display device to the frame generation rate of the source device further includes means for adjusting a duration of a respective vertical blank (VB) interval associated with each frame included in the plurality of frames over a defined VB range.

22. The system of claim 19 wherein the means for temporally synchronizing the source device and the sink device responsive to exiting the PSR operating mode further includes at least one of:
means for bidirectionally communicating one or more timing signals to the sink device, the one or more timing signals to maintain a frame-level temporal synchronization between the source device and the sink device; or
means for determining a universal Presentation Time Stamp (PTS) value associated with a frame and communicating, the source device control circuitry via the high-bandwidth communications link between the source device and the sink device, and in response to exiting the PSR operating mode, the frame having associated therewith the PTS value to maintain a frame-level temporal synchronization between the source device and the sink device.

\* \* \* \* \*